(12) United States Patent
Sugita

(10) Patent No.: US 9,715,094 B2
(45) Date of Patent: Jul. 25, 2017

(54) ZOOM LENS AND IMAGE PICKUP APPARATUS HAVING THE SAME

(71) Applicant: CANON KABUSHIKI KAISHA, Tokyo (JP)

(72) Inventor: Shigenobu Sugita, Shimotsuke (JP)

(73) Assignee: Canon Kabushiki Kaisha, Tokyo (JP)

( * ) Notice: Subject to any disclaimer, the term of this patent is extended or adjusted under 35 U.S.C. 154(b) by 307 days.

(21) Appl. No.: 13/934,898

(22) Filed: Jul. 3, 2013

(65) Prior Publication Data

US 2014/0009652 A1    Jan. 9, 2014

(30) Foreign Application Priority Data

Jul. 9, 2012  (JP) ................................ 2012-153684

(51) Int. Cl.
*G02B 15/22* (2006.01)
*G02B 15/14* (2006.01)
*G02B 15/177* (2006.01)

(52) U.S. Cl.
CPC ............. *G02B 15/22* (2013.01); *G02B 15/14* (2013.01); *G02B 15/177* (2013.01)

(58) Field of Classification Search
CPC ...... G02B 15/22; G02B 15/14; G02B 15/173; G02B 15/177; G02B 21/02; G02B 7/10; G02B 13/18; G02B 13/04; G02B 13/00; G02B 13/24; G02B 9/60; G02B 9/34; H04N 5/335; H04N 5/378

USPC ......... 348/294; 359/684, 693, 657–660, 686, 359/695, 713, 714, 750–757, 763, 764, 359/766, 772, 773
See application file for complete search history.

(56) References Cited

U.S. PATENT DOCUMENTS

| 2006/0279850 | A1* | 12/2006 | Horiuchi | ........................ 359/676 |
| 2009/0207501 | A1* | 8/2009 | Yokoyama | .................... 359/684 |
| 2011/0116174 | A1 | 5/2011 | Suzuki et al. | |
| 2011/0228158 | A1* | 9/2011 | Imaoka | ................ G02B 15/173 348/345 |
| 2012/0013994 | A1 | 1/2012 | Tashiro | |

FOREIGN PATENT DOCUMENTS

| CN | 1877387 A | 12/2006 |
| CN | 101334518 A | 12/2008 |
| CN | 101515059 A | 8/2009 |
| CN | 101859019 A | 10/2010 |
| JP | H02-296208 A | 12/1990 |

(Continued)

*Primary Examiner* — Jie Lei
(74) *Attorney, Agent, or Firm* — Canon U.S.A. Inc., IP Division

(57) ABSTRACT

A zoom lens includes, in order from an object side to an image side, a lens unit Ln having the highest negative refractive power of all the following lens units, a lens unit Lm2 having positive refractive power, a lens unit Lm having negative refractive power, and a rear lens group Lp including one or more lens units and having overall positive refractive power. During zooming, a distance between every adjacent lens units varies. During focusing from an infinite distance to a minimum object distance, the lens unit Ln and the lens unit Lm move toward the object side. The focal length $F_{Lm}$ of the lens unit Lm and the focal length $F_{Lm2}$ of the lens unit Lm2 are appropriately set.

10 Claims, 23 Drawing Sheets

(56) References Cited

FOREIGN PATENT DOCUMENTS

| JP | 11352402 A | 12/1999 |
|----|------------|---------|
| JP | 2000047107 A | 2/2000 |
| JP | 2011-197470 A | 10/2011 |
| JP | 2012-027261 A | 2/2012 |

\* cited by examiner

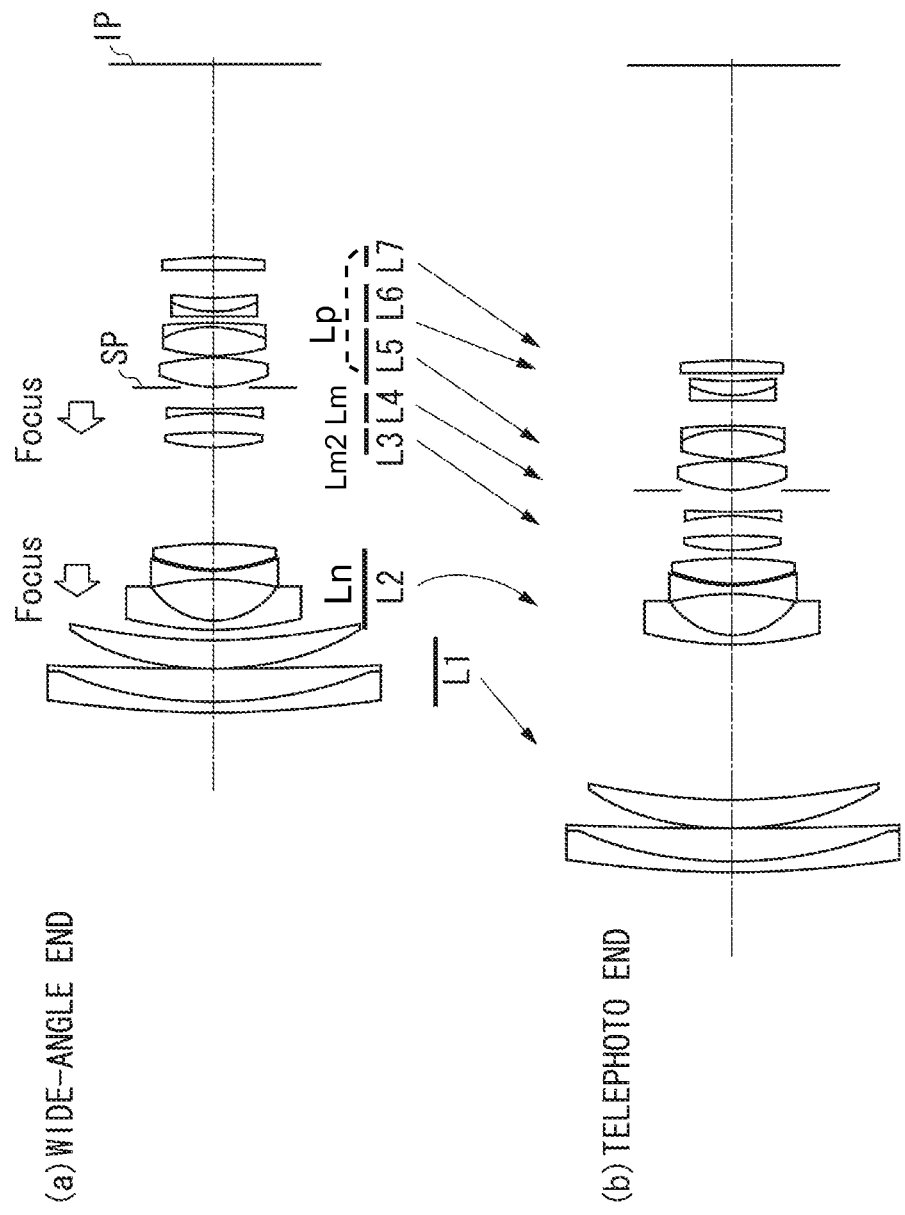

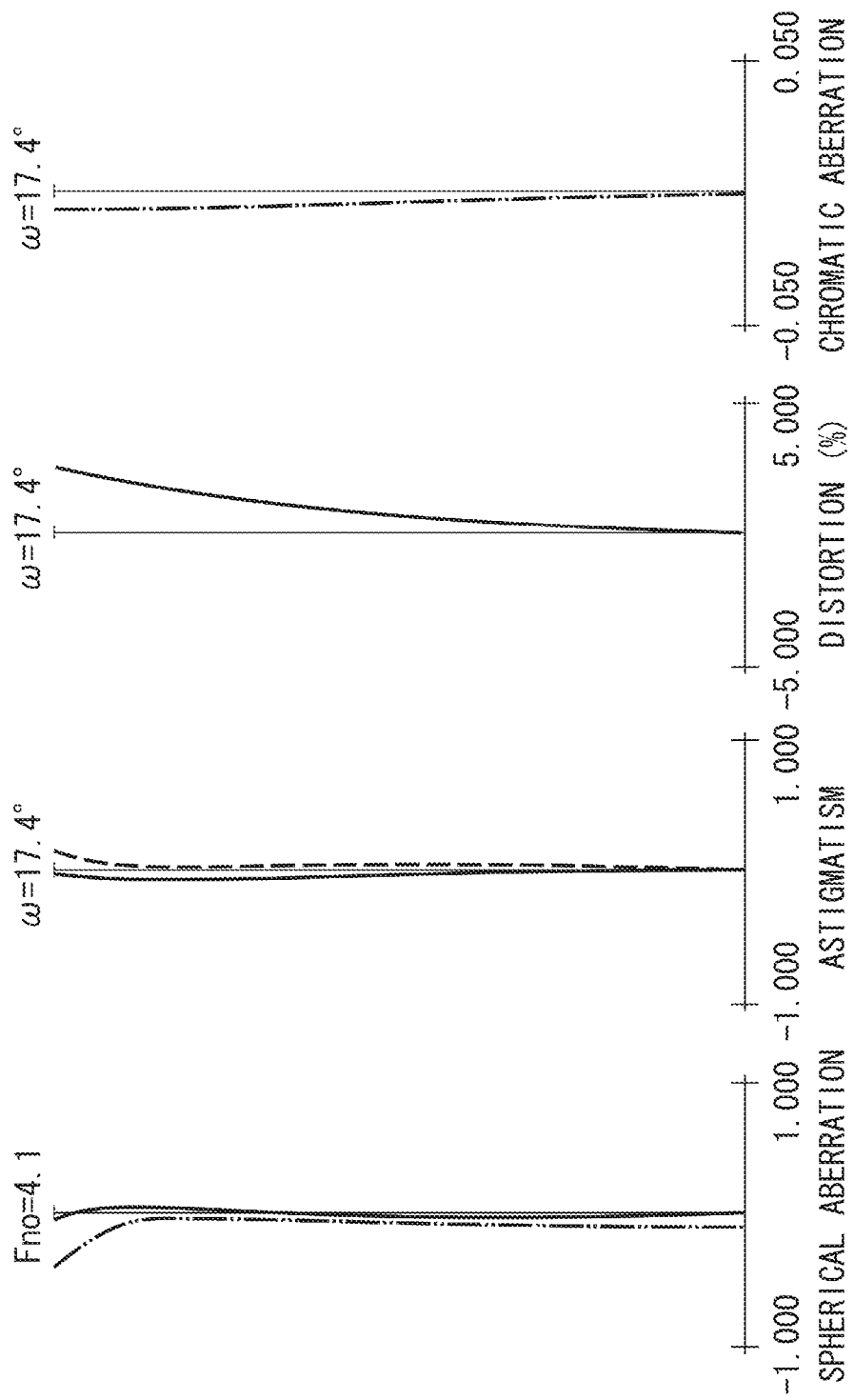

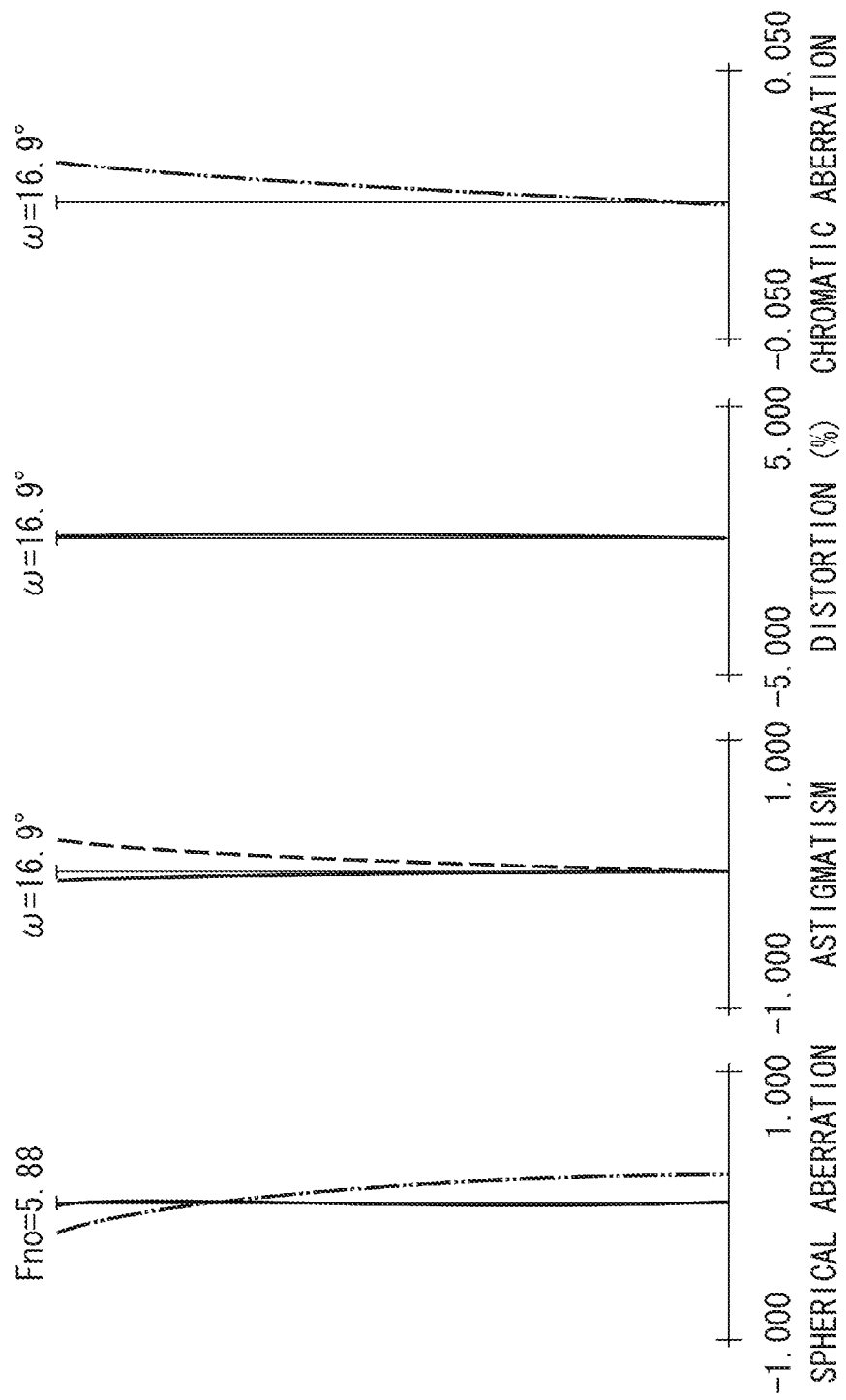

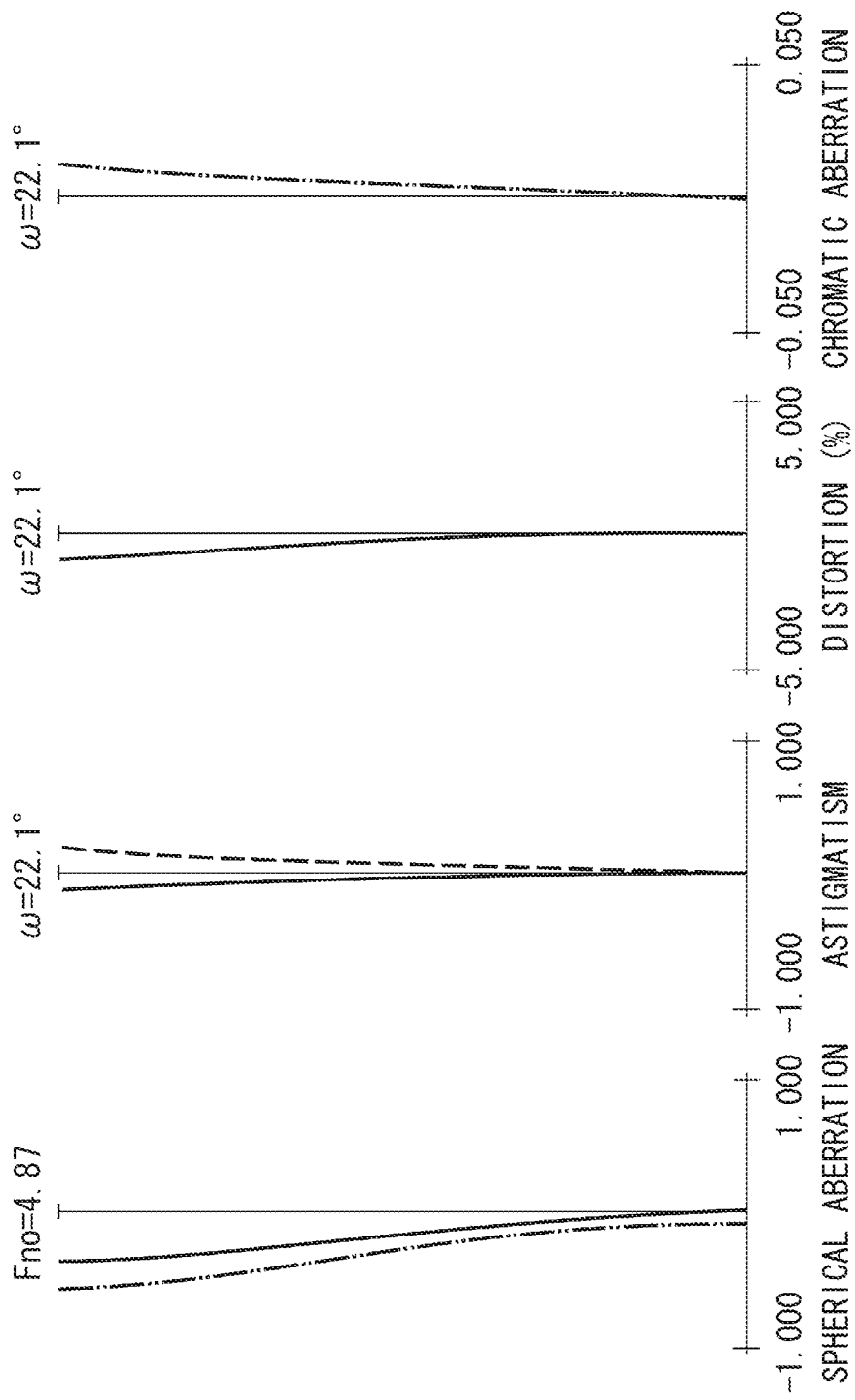

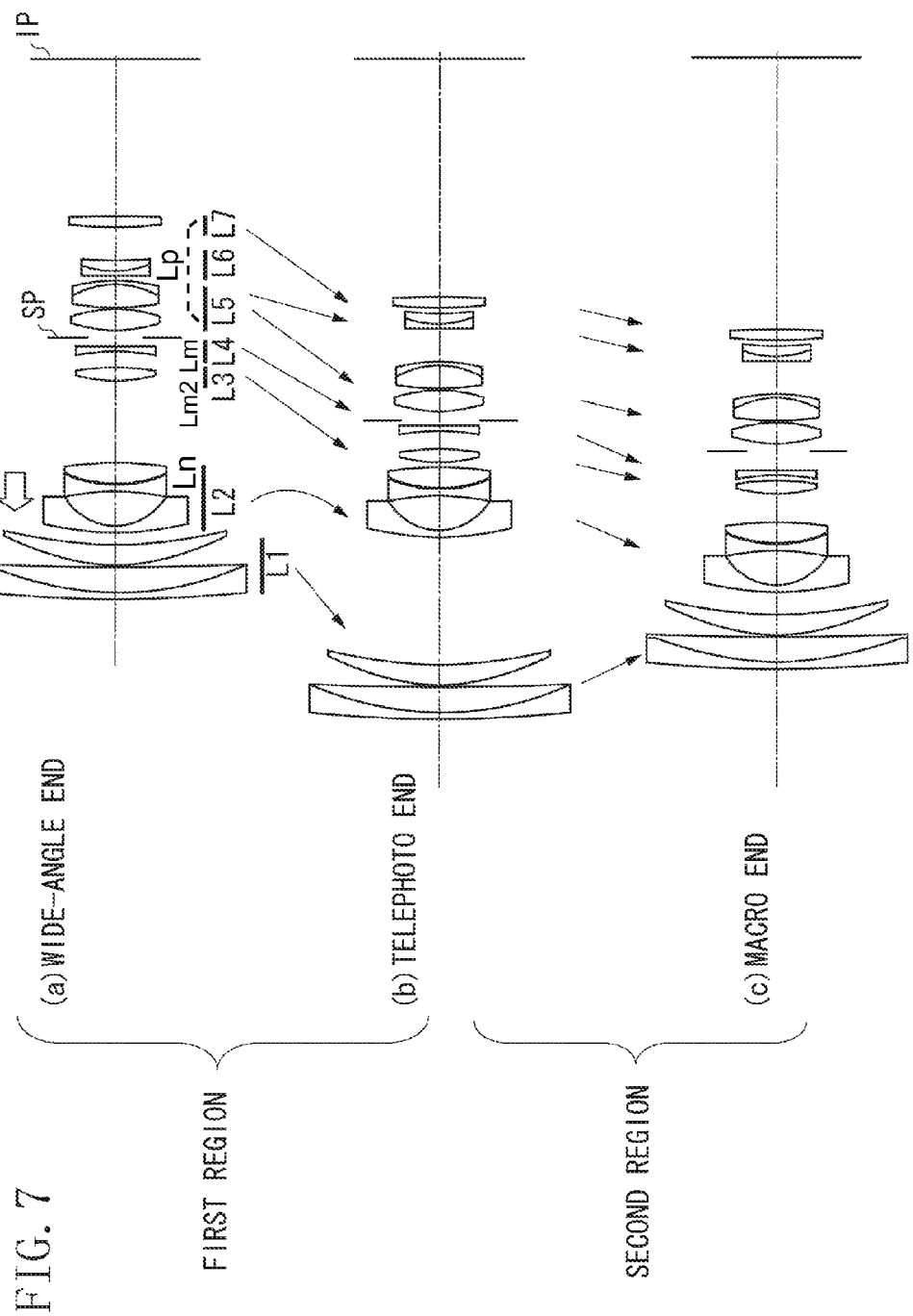

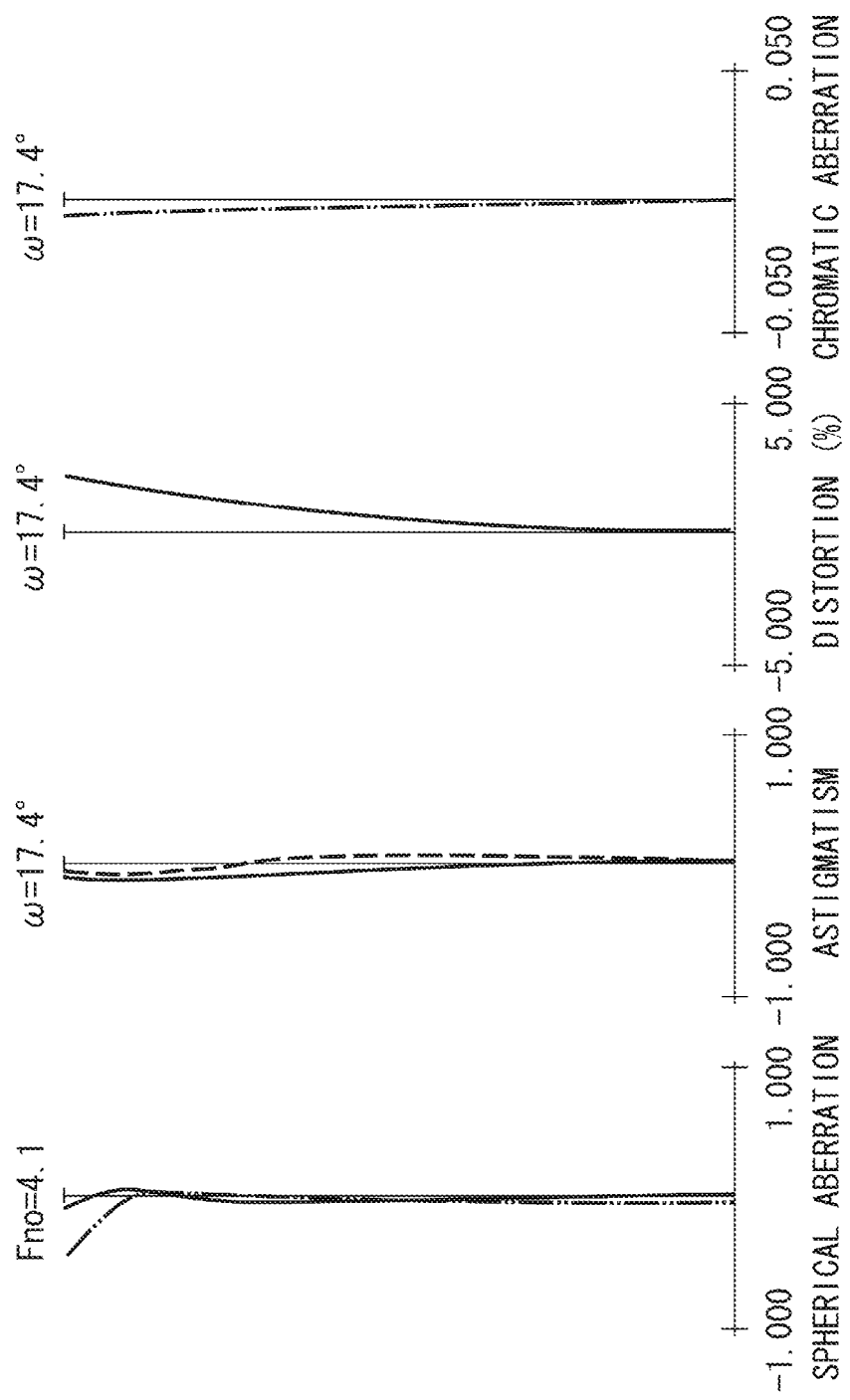

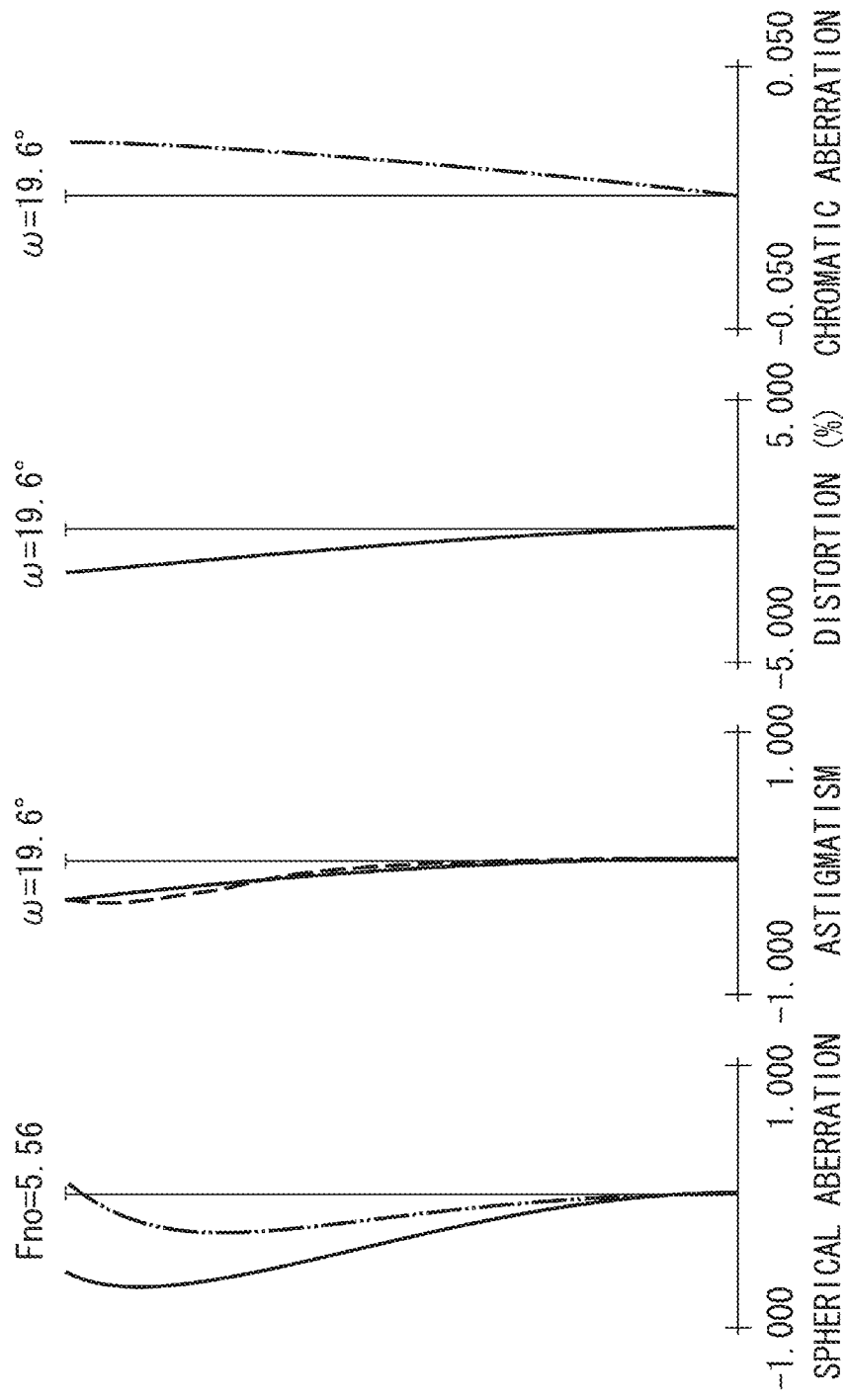

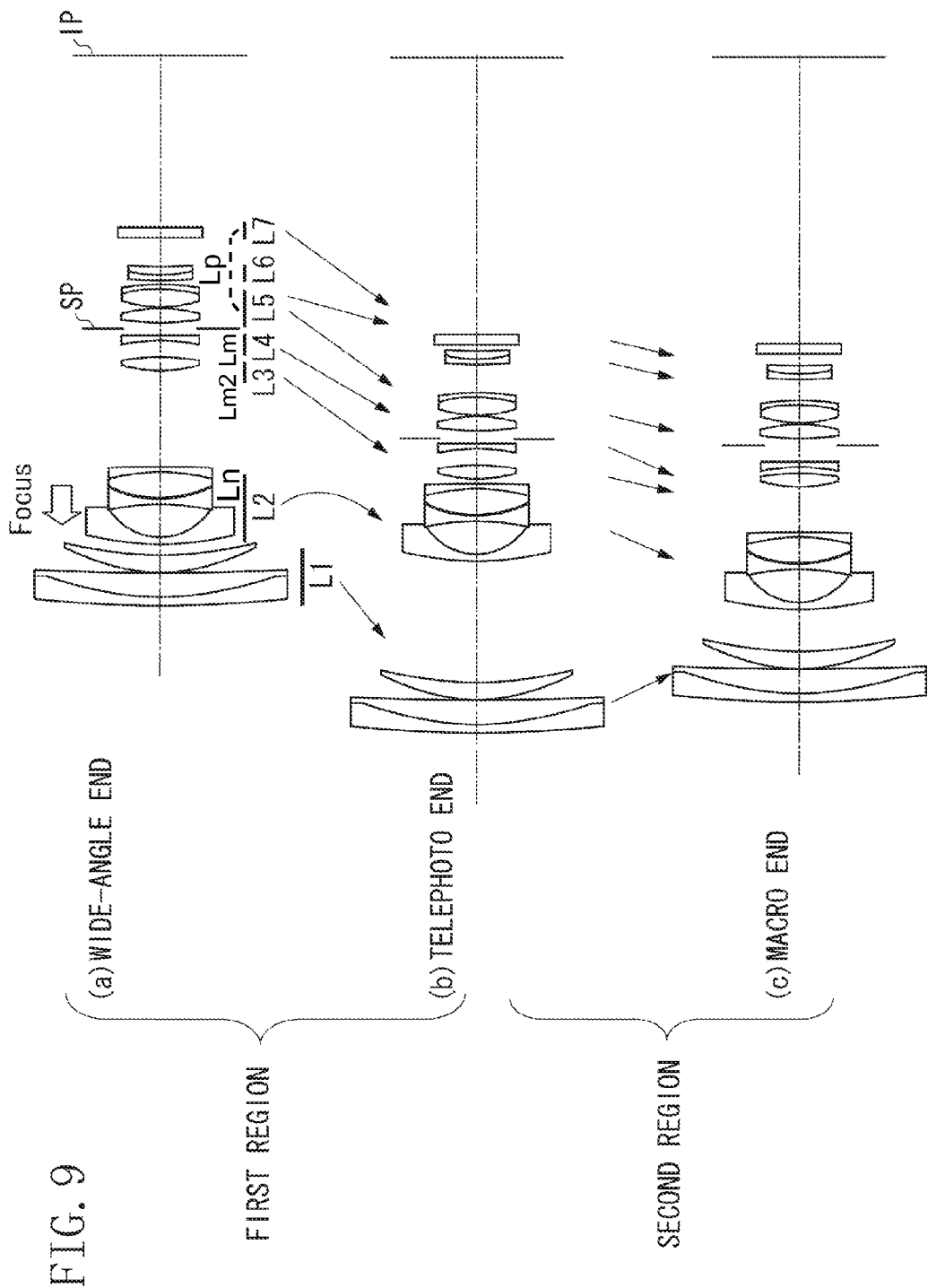

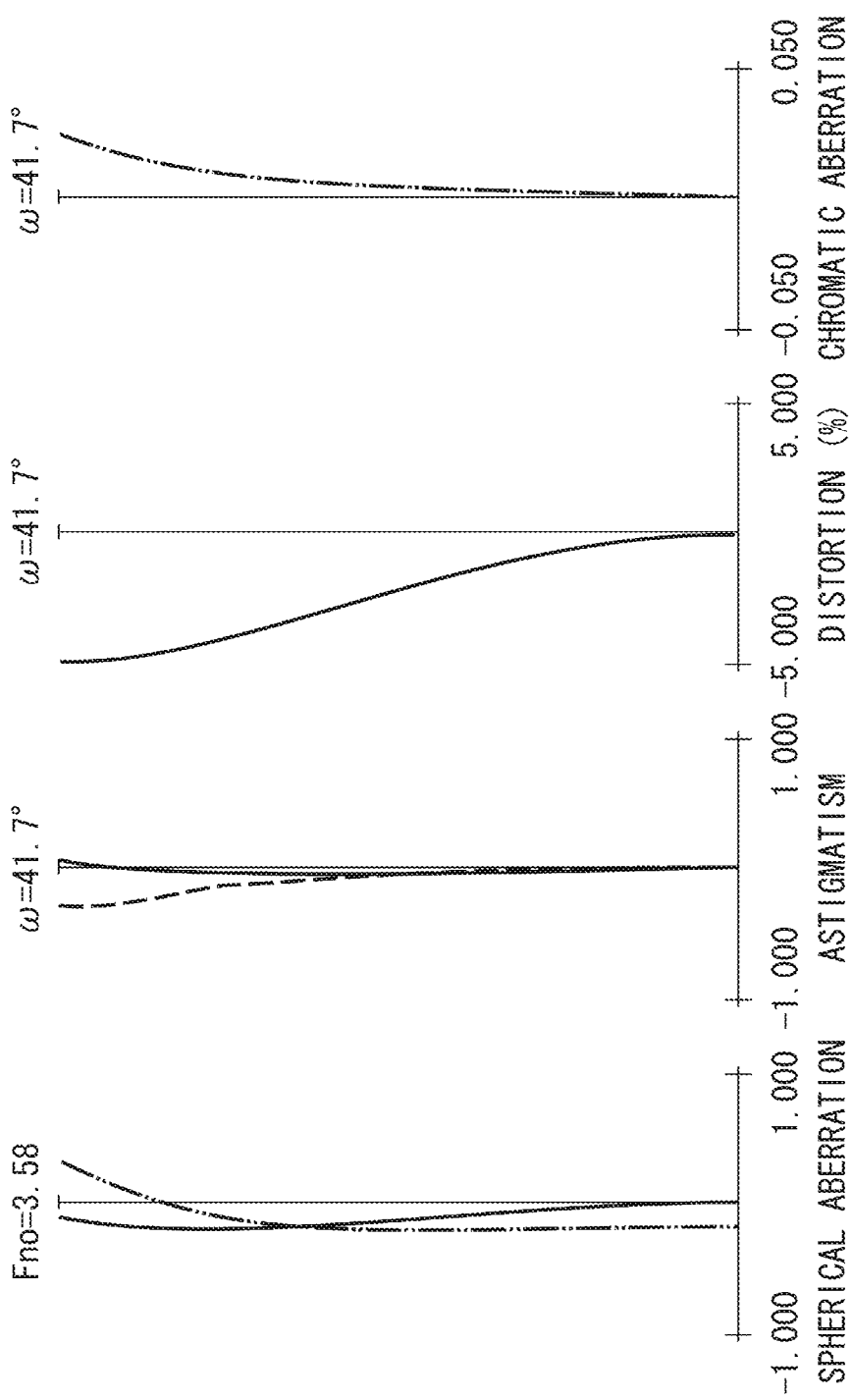

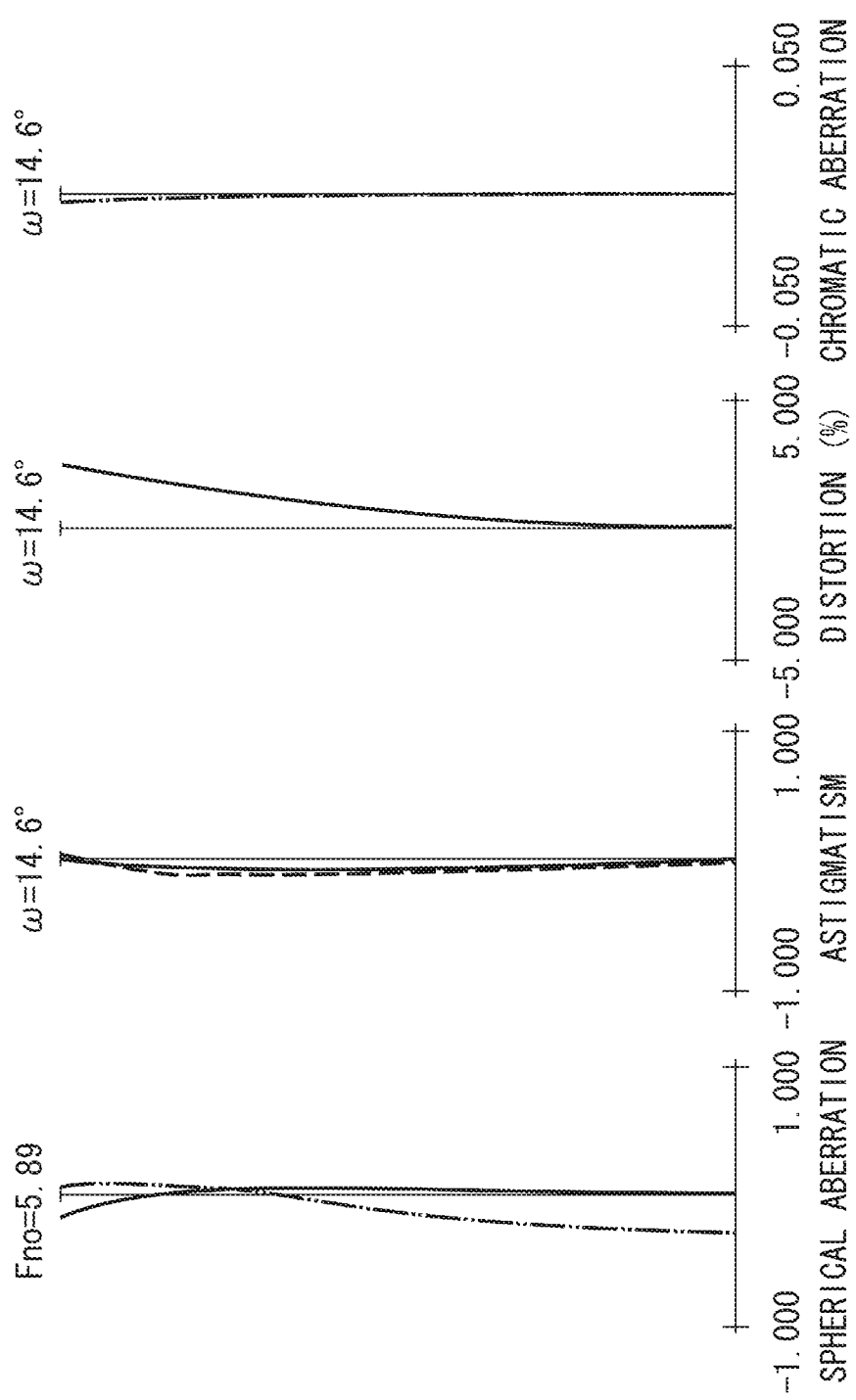

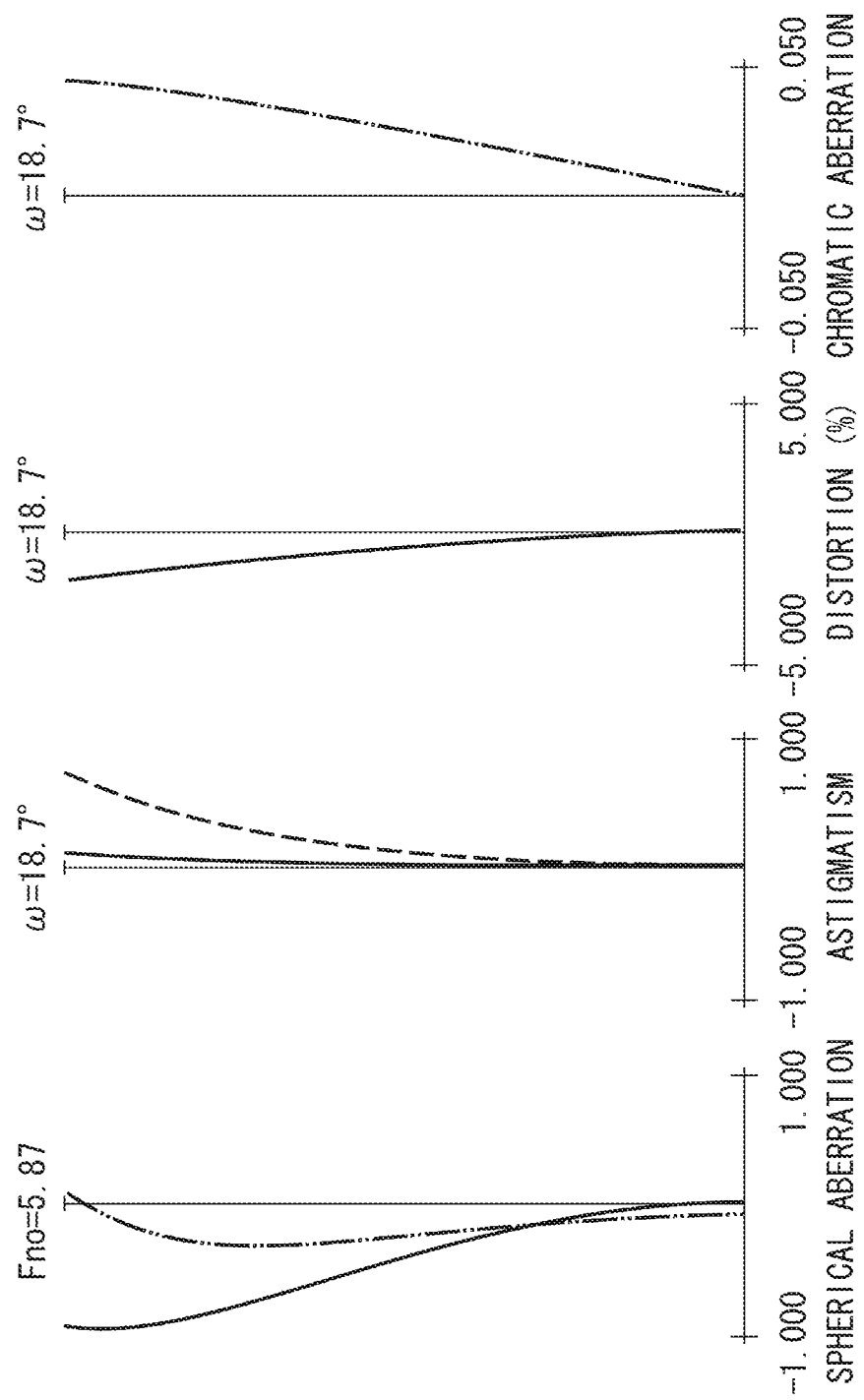

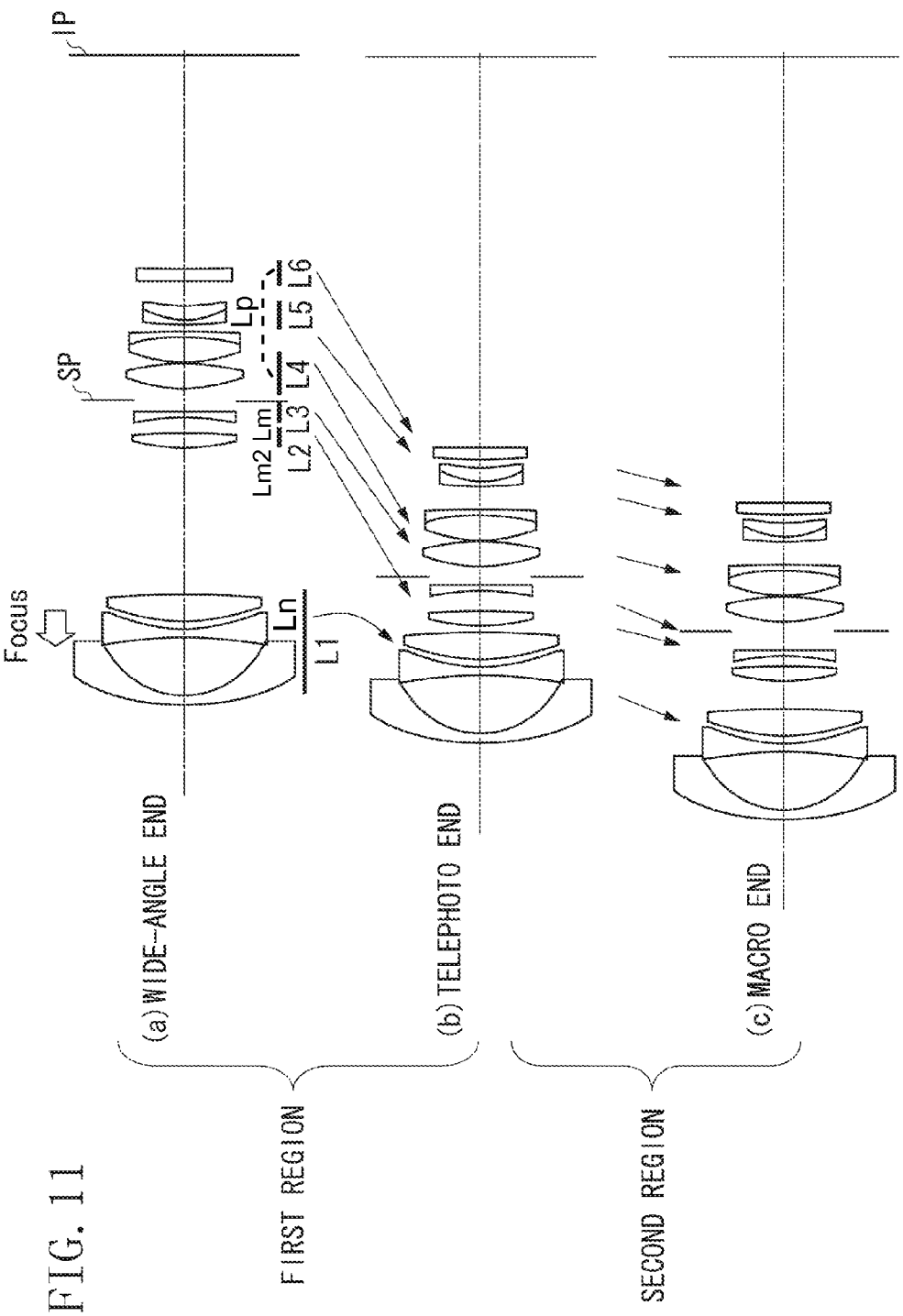

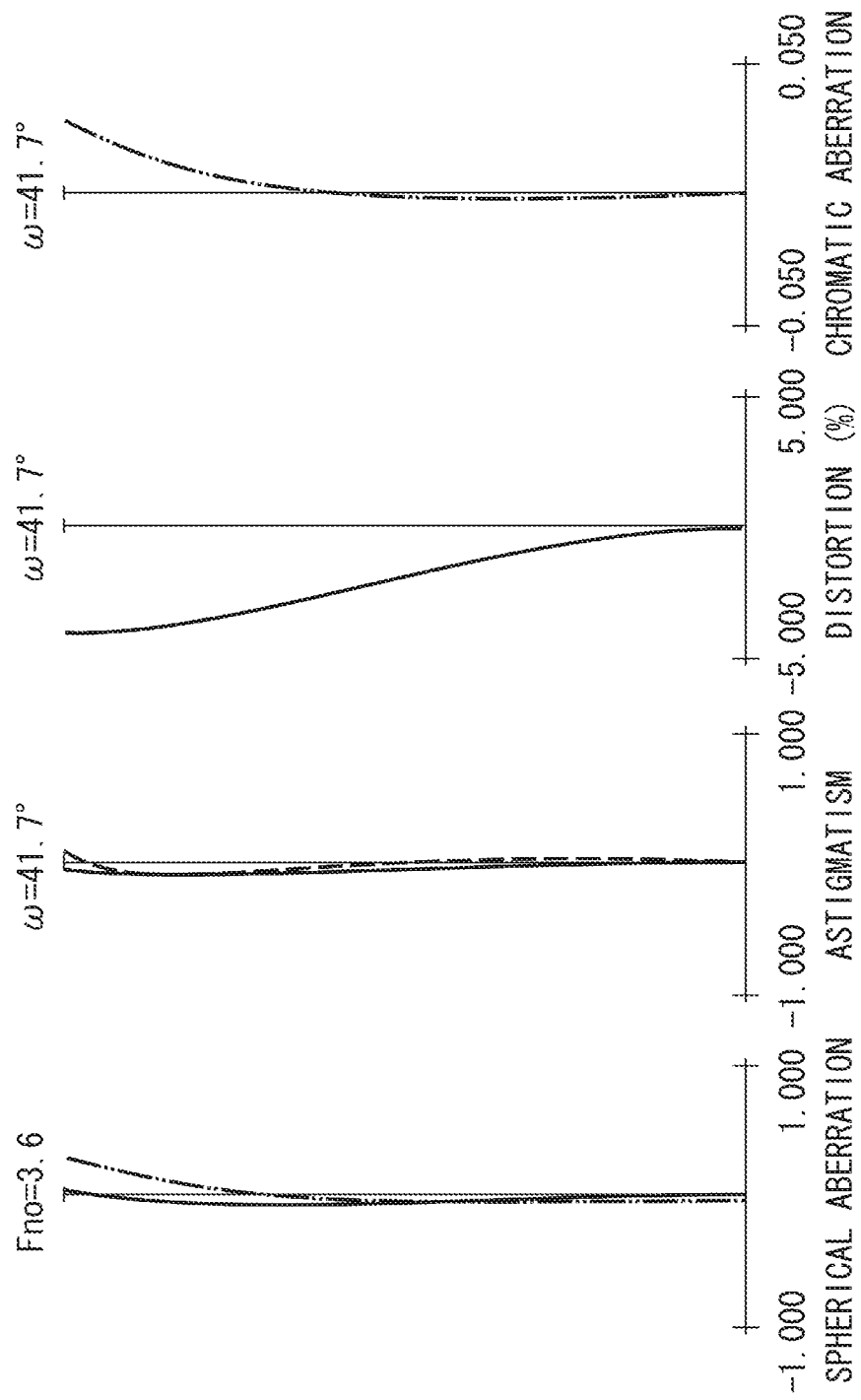

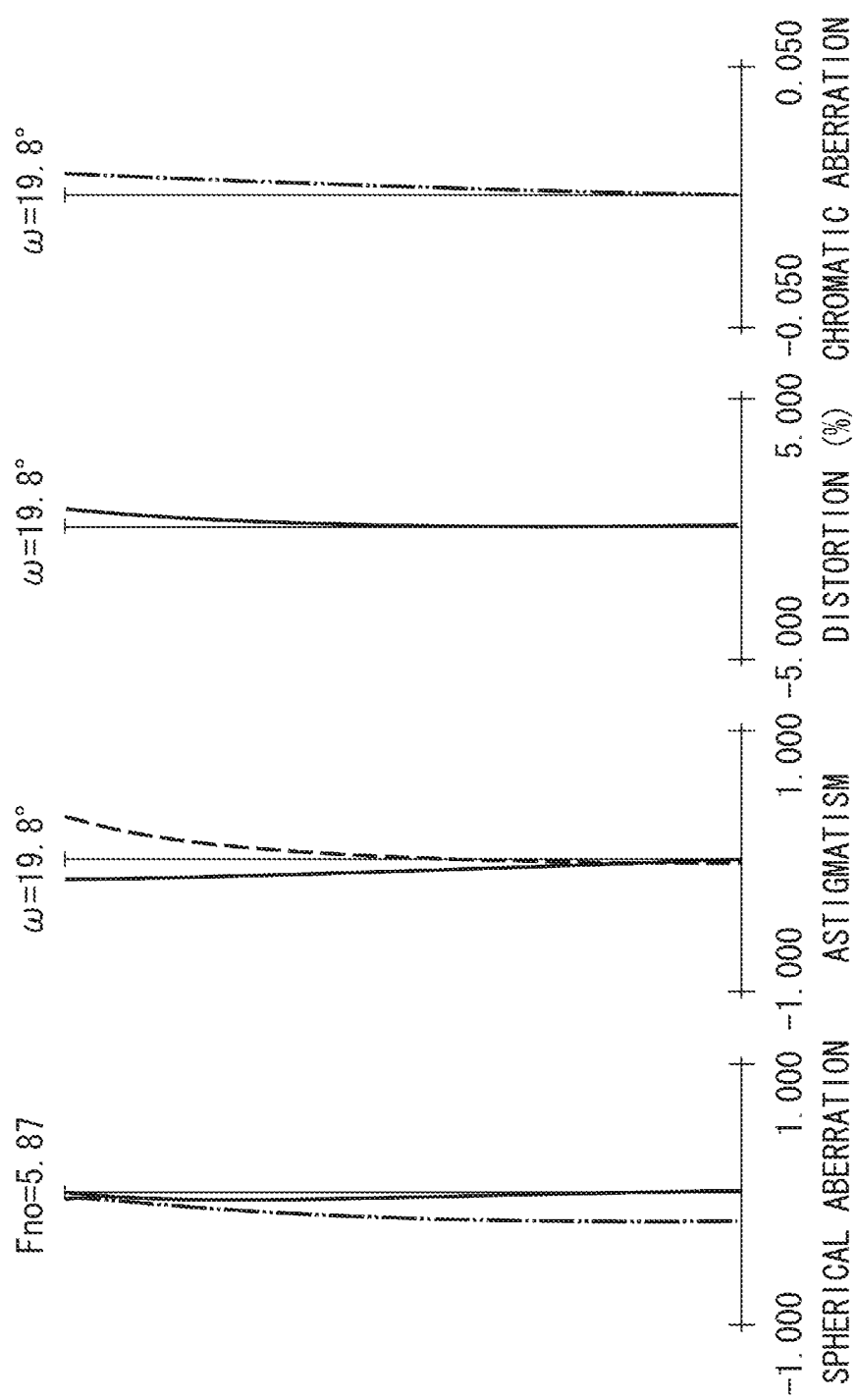

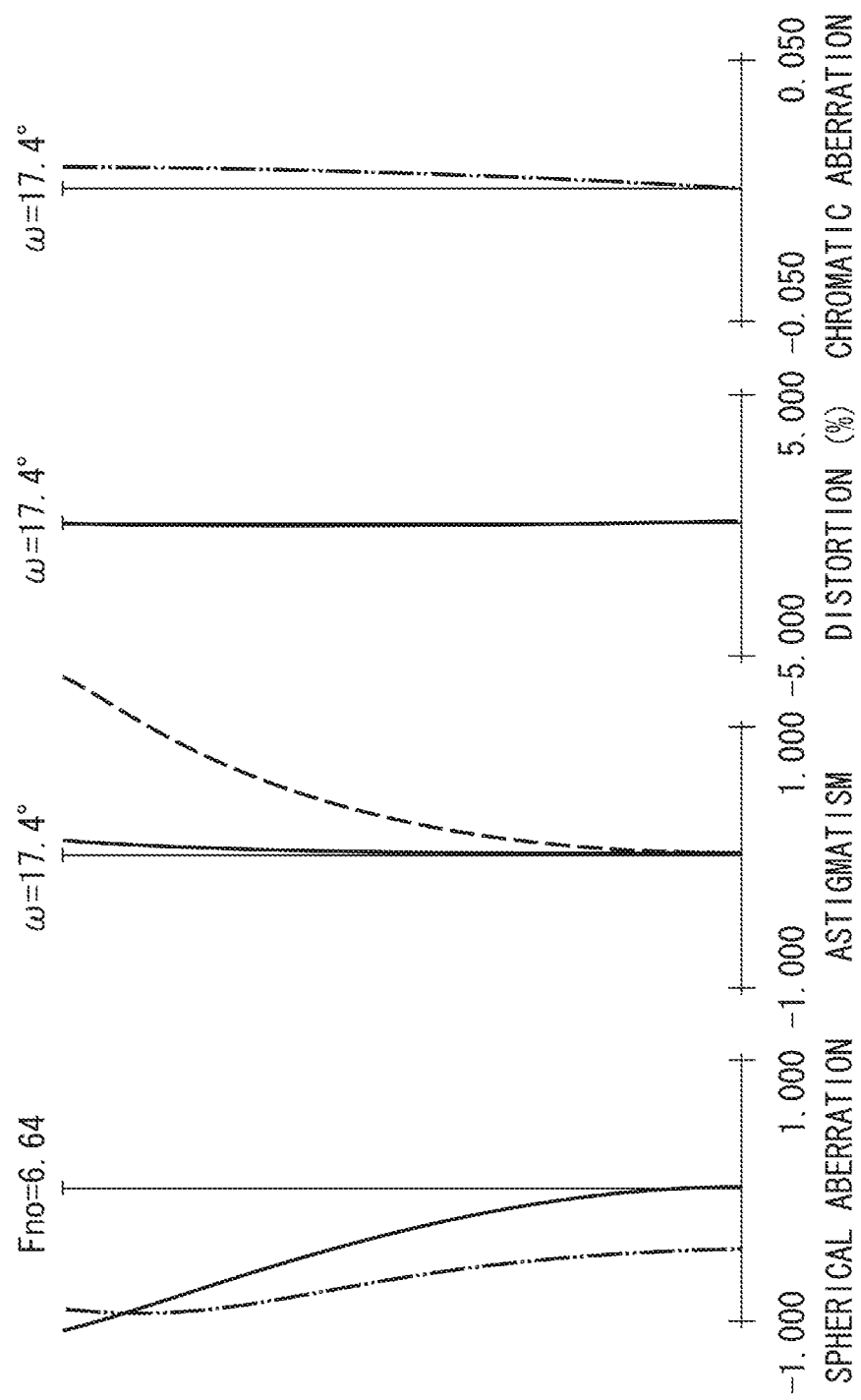

ZOOM LENS AND IMAGE PICKUP APPARATUS HAVING THE SAME

BACKGROUND OF THE INVENTION

Field of the Invention

The present invention relates to a zoom lens and an image pickup apparatus having the zoom lens, and is suitable for a photographic optical system such as a digital still camera, a digital video camera, a TV camera, and a monitoring camera.

Description of the Related Art

Photographic optical systems used for single-lens reflex cameras and video cameras, for example, are required to have high zoom ratios and capability to photograph at high photographing magnification.

Generally, when a photographable object distance is shortened to raise photographing magnification, wide aberration variations occur during focusing, and the ranges of the movements of the focusing lens units widen.

U.S. Patent Application Publication No. 2011/0116174 discusses a zoom lens including, in order from an object side to an image side, a first lens unit having positive refractive power, a second lens unit having negative refractive power, a third lens unit having positive refractive power, and a fourth lens unit having positive refractive power. In this zoom lens, the second lens unit moves during focusing.

Japanese Patent Application Laid-Open No. 2000-047107 discusses a zoom lens including, in order from an object side to an image side, a first lens unit having positive refractive power, a second lens unit having negative refractive power, a third lens unit having positive refractive power, a fourth lens unit having negative refractive power, a fifth lens unit having positive refractive power, and a sixth lens unit having negative refractive power. In this zoom lens, a floating focus scheme, in which two of the lens units move during focusing, is used.

Japanese Patent Application Laid-Open No. 11-352402 discusses a zoom lens including, in order from an object side to an image side, a first lens unit having positive refractive power, a second lens unit having negative refractive power, a third lens unit having positive refractive power, a fourth lens unit having negative refractive power, a fifth lens unit having positive refractive power. During focusing from an infinite distance to a predetermined finite distance, the third lens unit moves. During focusing on an object distance being shorter than the predetermined finite distance (macrofocusing), the first lens unit moves toward the object side, and the second lens unit moves toward the image side to widen the distance between the first lens unit and the second lens unit. At the same time, the third lens unit moves toward the image side.

SUMMARY OF THE INVENTION

The present invention is directed to a zoom lens that can perform close photographing with the entire zoom lens being compact and having high performance.

According to an aspect of the present invention, a zoom lens includes, in order from an object side to an image side, a lens unit Ln having negative refractive power, a lens unit Lm2 having positive refractive power, a lens unit Lm having negative refractive power, and a rear lens group Lp including one or more lens units and having overall positive refractive power. During zooming, a distance between every adjacent lens units varies. The lens unit Ln has the highest negative refractive power of all the lens units. During focusing from an infinite distance to a minimum object distance, the lens unit Ln and the lens unit Lm move toward the object side. The following condition is satisfied:

$$0.65 < |F_{Lm}/F_{Lm2}| < 1.50,$$

where $F_{Lm}$ is a focal length of the lens unit Lm and $F_{Lm2}$ is a focal length of the lens unit Lm2.

According to another aspect of the present invention, a zoom lens includes, in order from an object side to an image side, a lens unit Ln having negative refractive power, a lens unit Lm2 having positive refractive power, a lens unit Lm having negative refractive power, and a rear lens group Lp including one or more lens units and having overall positive refractive power. During zooming, a distance between every adjacent lens units varies. The lens unit Ln has the highest negative refractive power of all the lens units. By moving the lens unit Ln toward the object side, focusing from an infinite distance to a predetermined finite distance is performed. By moving at least the lens unit Ln and the lens unit Lm at a telephoto end, macrofocusing on an object distance being shorter than the predetermined finite distance is performed. The following condition is satisfied:

$$0.65 < |F_{Lm}/F_{Lm2}| < 1.50,$$

where FLm is a focal length of the lens unit Lm and FLm2 is a focal length of the lens unit Lm2.

According to yet another aspect of the present invention, a zoom lens includes, in order from an object side to an image side, a lens unit Ln having negative refractive power, a lens unit Lm2 having positive refractive power, a lens unit Lm having negative refractive power, and a rear lens group Lp including one or more lens units and having overall positive refractive power. During zooming, a distance between every adjacent lens units varies. The lens unit Ln has the highest negative refractive power of all the lens units. By moving the lens unit Ln toward the object side, focusing from an infinite distance to a predetermined finite distance is performed. By moving at least the lens unit Ln and the lens unit Lm at a telephoto end, macrofocusing on an object distance being shorter than the predetermined finite distance is performed.

Further features of the present invention will become apparent from the following description of exemplary embodiments with reference to the attached drawings.

BRIEF DESCRIPTION OF THE DRAWINGS

FIG. 1 illustrates lens cross-sectional views of a zoom lens according to a first exemplary embodiment of the present invention at a wide-angle end and at a telephoto end, respectively.

FIGS. 2A and 2B are respectively aberration diagrams drawn at the wide-angle end and aberration diagrams drawn at the telephoto end during infinite-distance focusing by the zoom lens according to the first exemplary embodiment of the invention.

FIGS. 5A and 5B are respectively aberration diagrams drawn at the wide-angle end and aberration diagrams drawn at the telephoto end during infinite-distance focusing by the zoom lens according to the second exemplary embodiment of the invention.

FIGS. 6A and 6B are respectively aberration diagrams drawn at the wide-angle end and aberration diagrams drawn at the telephoto end during short-distance focusing by the zoom lens according to the second exemplary embodiment of the invention.

FIG. 7 illustrates lens cross-sectional views of a zoom lens according to a third exemplary embodiment of the invention at a wide-angle end, at a telephoto end, and at a macro end, respectively.

FIGS. 8A and 8B are respectively aberration diagrams drawn at the wide-angle end and aberration diagrams drawn at the telephoto end during infinite-distance focusing by the zoom lens according to the third exemplary embodiment of the invention, and FIG. 8C is aberration diagrams drawn at the macro end.

FIG. 9 illustrates lens cross-sectional views of a zoom lens according to a fourth exemplary embodiment of the invention at a wide-angle end, at a telephoto end, and at a macro end, respectively.

FIGS. 10A and 10B are respectively aberration diagrams drawn at the wide-angle end and aberration diagrams drawn at the telephoto end during infinite-distance focusing by the zoom lens according to the fourth exemplary embodiment of the invention, and FIG. 10C is aberration diagrams drawn at the macro end.

FIG. 11 illustrates lens cross-sectional views of a zoom lens according to a fifth exemplary embodiment of the invention at a wide-angle end, at a telephoto end, and at a macro end, respectively.

FIGS. 12A and 12B are respectively aberration diagrams drawn at the wide-angle end and aberration diagrams drawn at the telephoto end during infinite-distance focusing by the zoom lens according to the fifth exemplary embodiment of the invention, and FIG. 12C is aberration diagrams drawn at the macro end.

DESCRIPTION OF THE EMBODIMENTS

A zoom lens according to an exemplary embodiment of the present invention includes a plurality of lens units, and a distance between every adjacent lens units varies during zooming. On the image side of a lens unit Ln having the highest negative refractive power (having the largest absolute value of refractive power) of the lens units, a lens unit Lm2 having positive refractive power, a lens unit Lm having negative refractive power, and a rear lens group Lp including one or more lens units and having overall positive refractive power are provided in order from an object side to the image side. During focusing from an infinite distance to a minimum object distance, the lens unit Ln moves toward the object side.

Figure 2A:
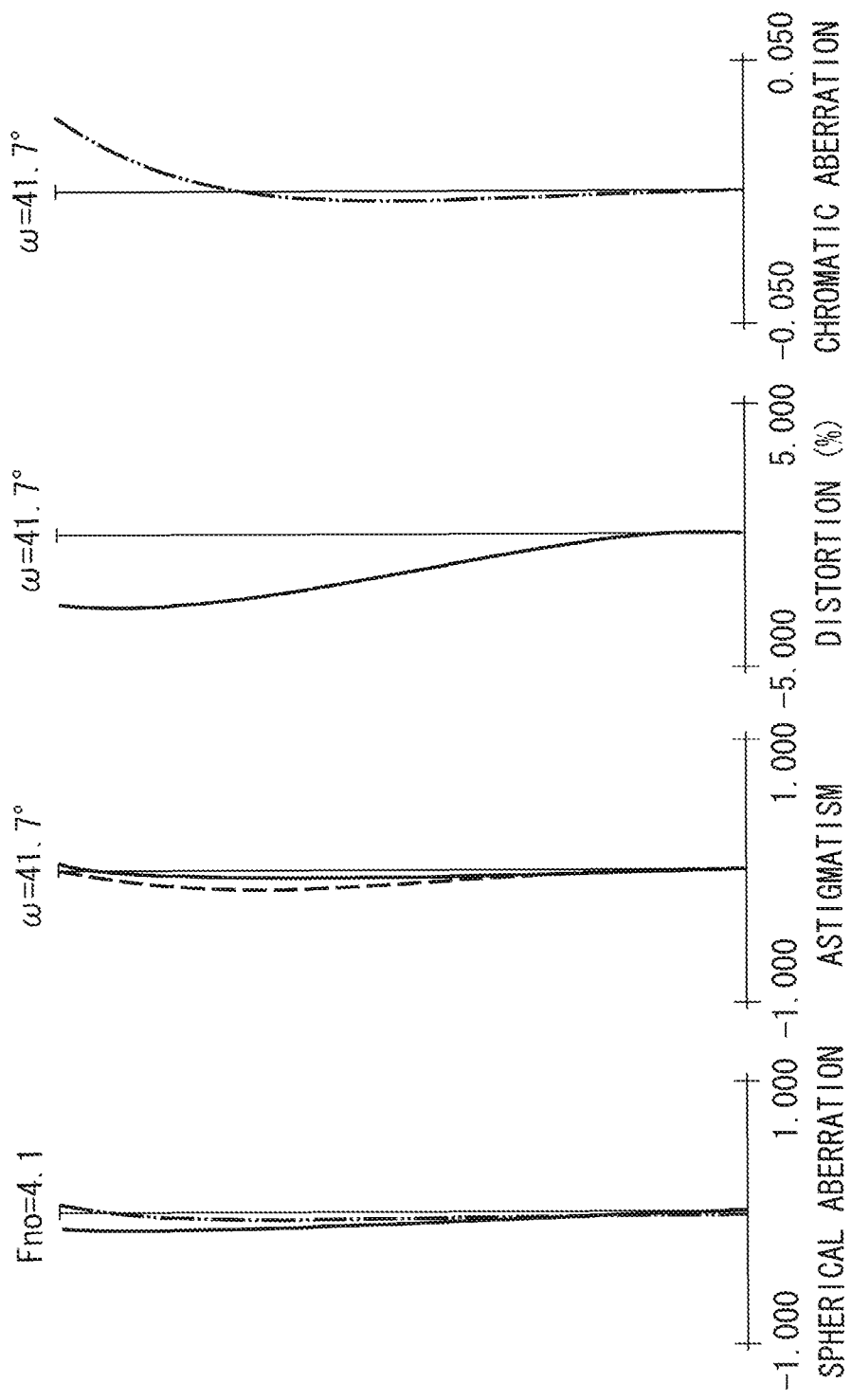
Figure 3A:
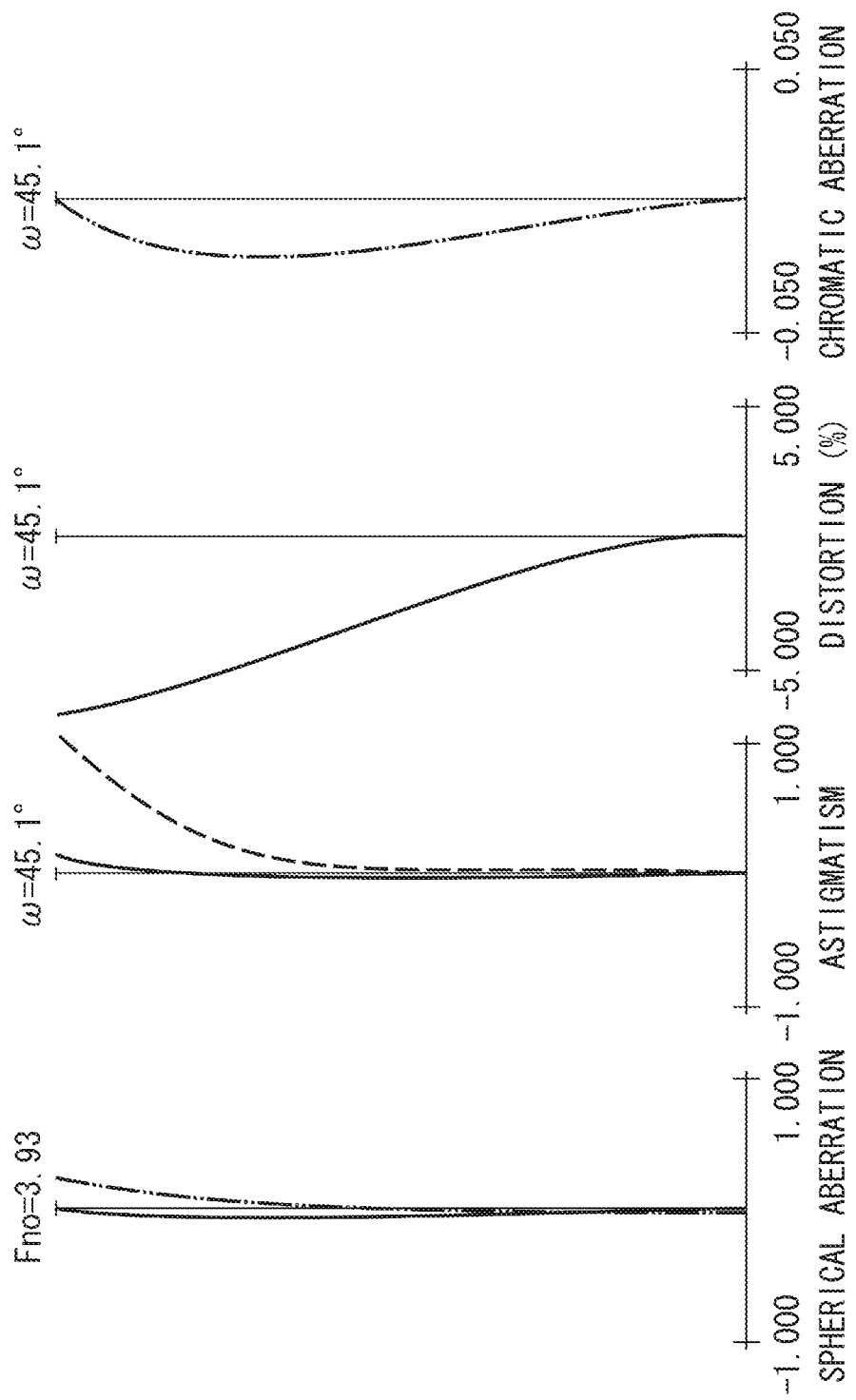
FIGS. 3A and 3B are respectively aberration diagrams drawn at the wide-angle end and aberration diagrams drawn at the telephoto end during short-distance focusing by the zoom lens according to the first exemplary embodiment of the invention.
Figure 3B:
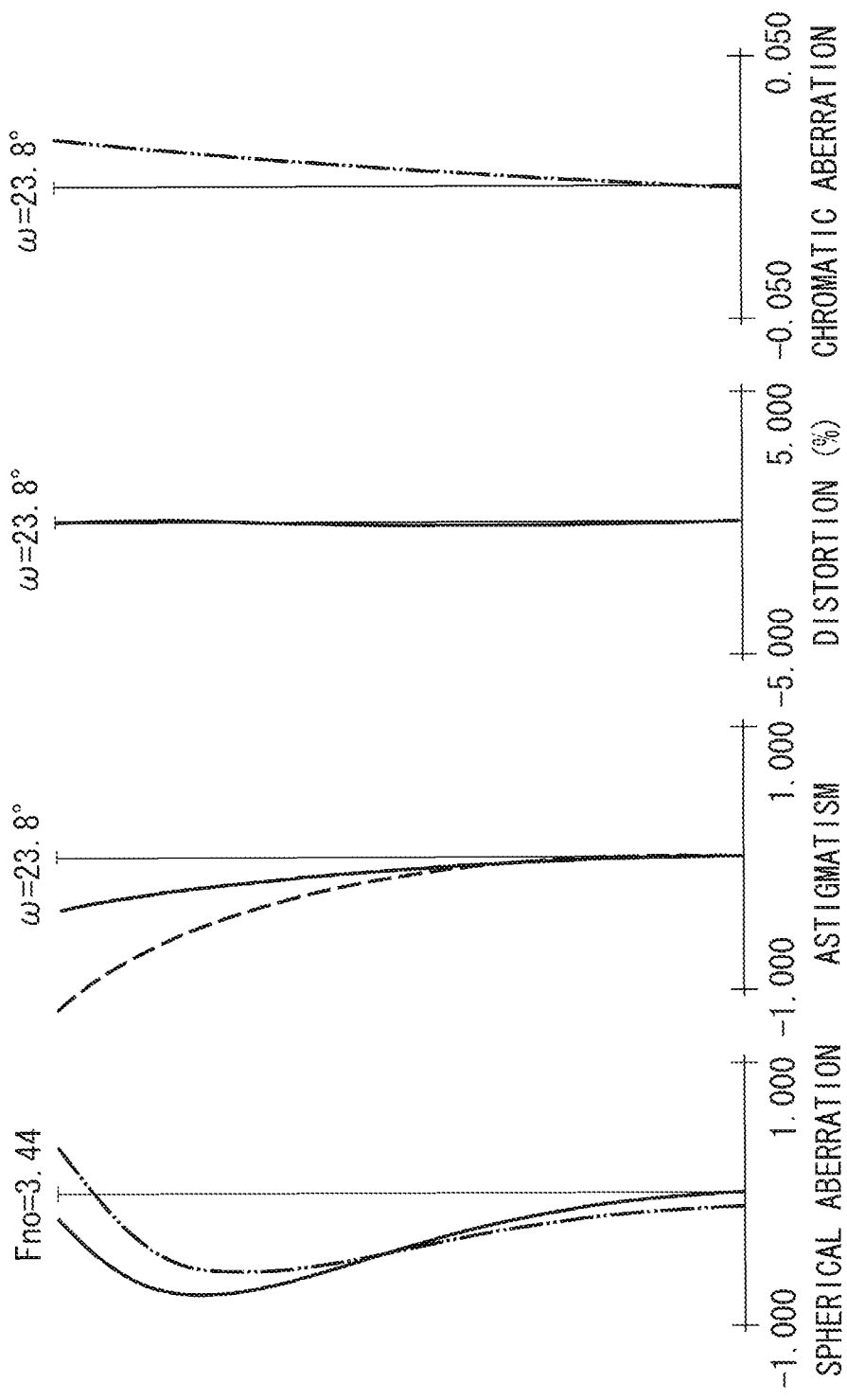

FIG. 1 illustrates lens cross-sectional views of a zoom lens according to a first exemplary embodiment of the present invention at a wide-angle end and at a telephoto end, respectively. FIGS. 2A and 2B are respectively aberration diagrams drawn at the wide-angle end and aberration diagrams drawn at the telephoto end during infinite-distance focusing using the zoom lens according to the first exemplary embodiment of the invention. FIGS. 3A and 3B are respectively aberration diagrams drawn at the wide-angle end and aberration diagrams drawn at the telephoto end during short-distance focusing by the zoom lens according to the first exemplary embodiment of the invention.

Figure 4:
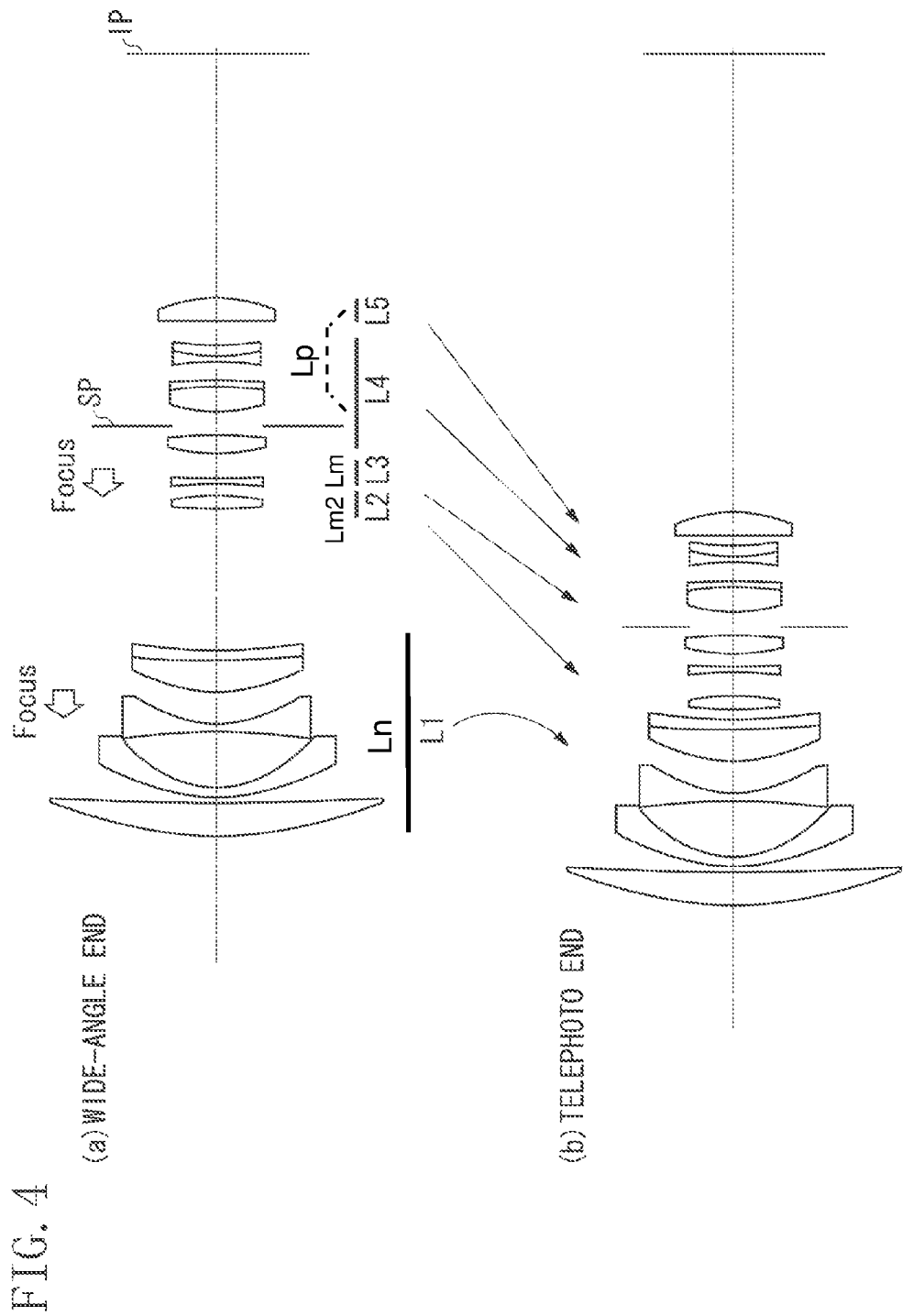
FIG. 4 illustrates lens cross-sectional views of a zoom lens according to a second exemplary embodiment of the invention at a wide-angle end and at a telephoto end, respectively.
Figure 5A:
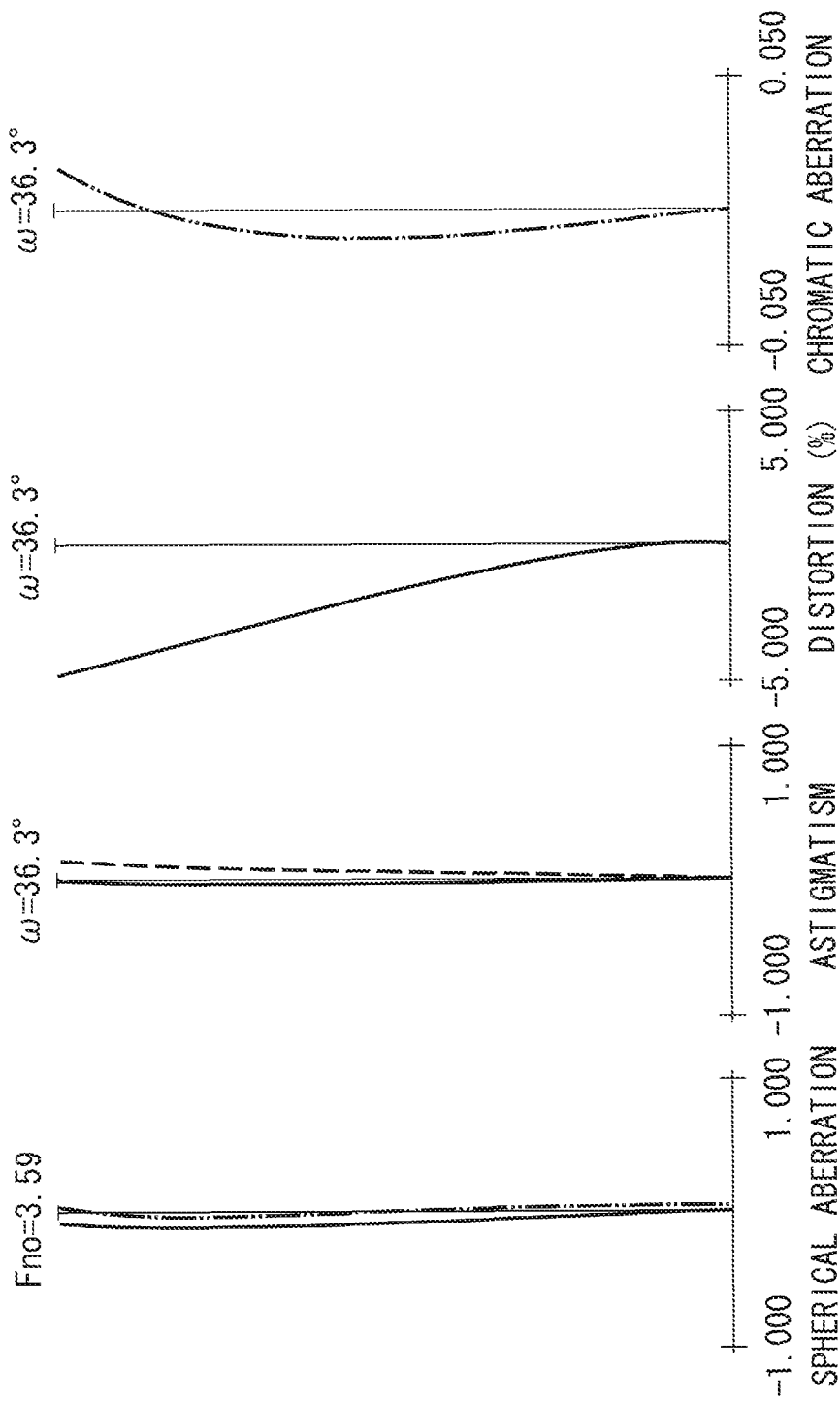
Figure 6A:
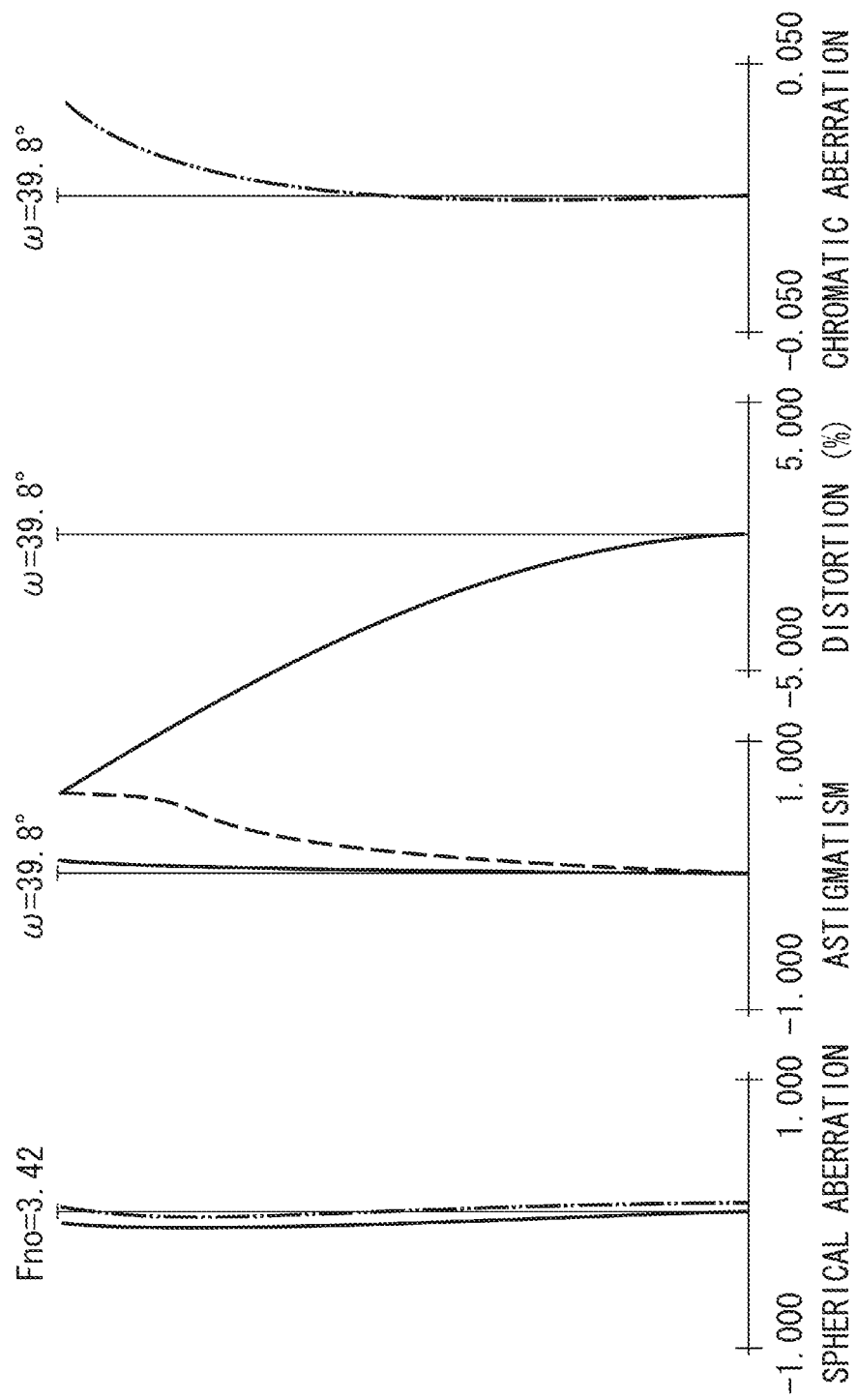

FIG. 4 illustrates lens cross-sectional views of a zoom lens according to a second exemplary embodiment of the invention at a wide-angle end and at a telephoto end, respectively. FIGS. 5A and 5B are respectively aberration diagrams drawn at the wide-angle end and aberration diagrams drawn at the telephoto end during infinite-distance focusing by the zoom lens according to the second exemplary embodiment of the invention. FIGS. 6A and 6B are respectively aberration diagrams drawn at the wide-angle end and aberration diagrams drawn at the telephoto end during short-distance focusing by the zoom lens according to the second exemplary embodiment of the invention.

Figure 8A:
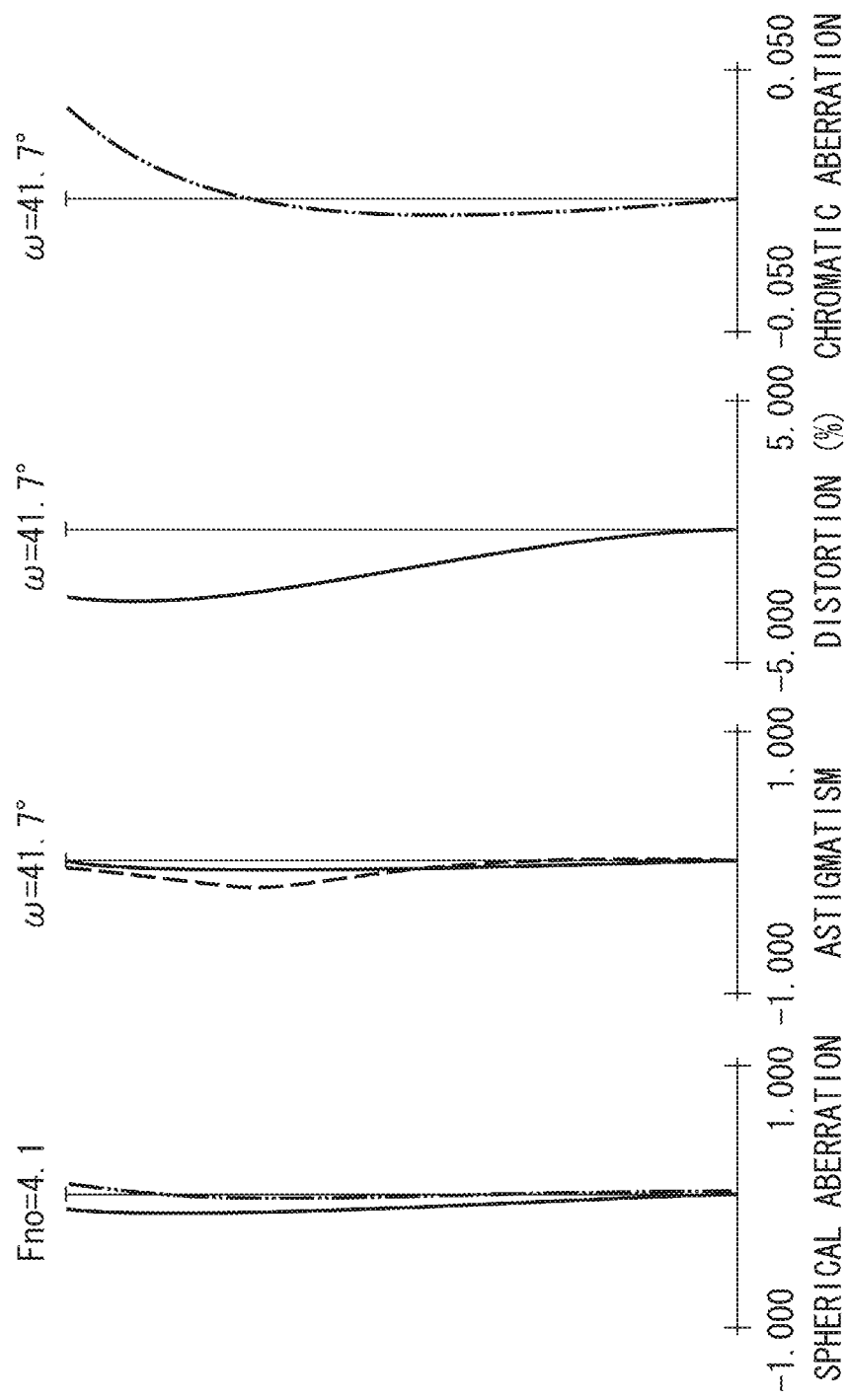

FIG. 7 illustrates lens cross-sectional views of a zoom lens according to a third exemplary embodiment of the invention at a wide-angle end, at a telephoto end, and at a macro end, respectively. FIGS. 8A and 8B are respectively aberration diagrams drawn at the wide-angle end and aberration diagrams drawn at the telephoto end during infinite-distance focusing by the zoom lens according to the third exemplary embodiment of the invention; FIG. 8C is aberration diagrams drawn at the macro end.

FIG. 9 illustrates lens cross-sectional views of a zoom lens according to a fourth exemplary embodiment of the invention at a wide-angle end, at a telephoto end, and at a macro end, respectively. FIGS. 10A and 10B are respectively aberration diagrams drawn at the wide-angle end and aberration diagrams drawn at the telephoto end during infinite-distance focusing by the zoom lens according to the fourth exemplary embodiment of the invention; FIG. 10C is aberration diagrams drawn at the macro end.

FIG. 11 illustrates lens cross-sectional views of a zoom lens according to a fifth exemplary embodiment of the invention at a wide-angle end, at a telephoto end, and at a macro end, respectively. FIGS. 12A and 12B are respectively aberration diagrams drawn at the wide-angle end and aberration diagrams drawn at the telephoto end during infinite-distance focusing by the zoom lens according to the fifth exemplary embodiment of the invention; FIG. 12C is aberration diagrams drawn at the macro end.

Figure 13:
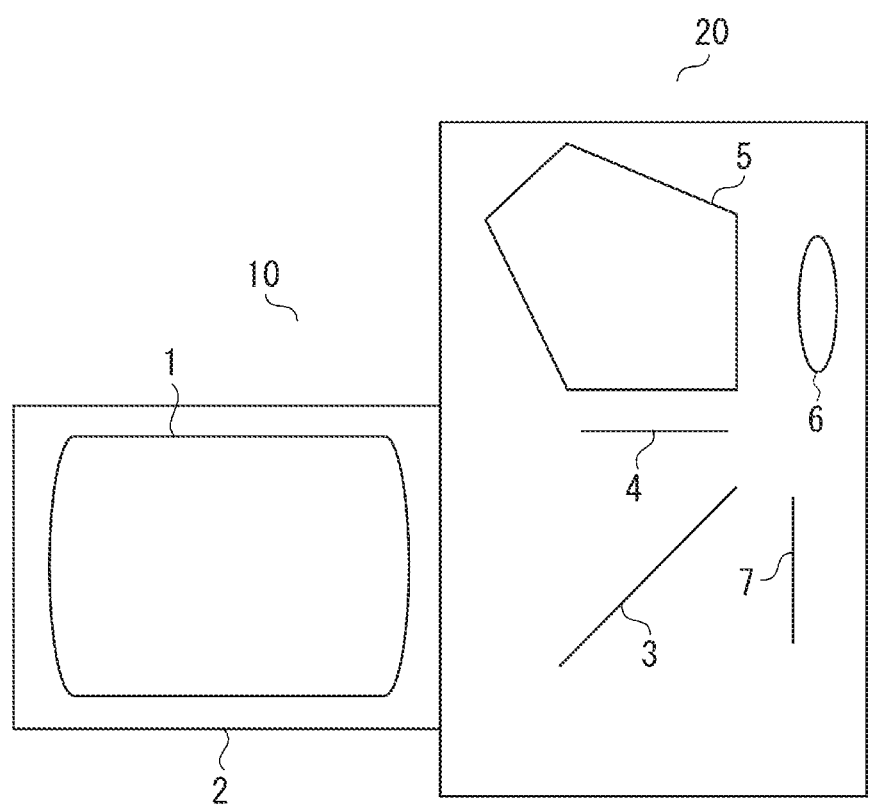
FIG. 13 is a schematic view of main components of an image pickup apparatus according to an exemplary embodiment of the invention.

FIG. 13 is a schematic view of main components of an image pickup apparatus according to an exemplary embodiment of the present invention.

As depicted in those lens cross-sectional views, the zoom lenses include an i-th lens unit Li (i represents the number of the lens unit counted from the object side), a rear lens group Lp including one or more lens units and having overall positive refractive power, and an aperture stop SP. As an image plane IP, the imaging surface of a solid-state image sensor (photoelectric conversion element), such as a charge-coupled device (CCD) sensor or a complementary metal-oxide semiconductor (CMOS) sensor, is used when using the zoom lens as a photographic optical system for a video camera or a digital still camera, or the photosensitive surface of a film is used when using the zoom lens as a photographic optical system for a silver-halide film camera.

As depicted in the lens cross-sectional views of FIGS. 7, 9, and 11, a first region is a zooming region where zooming and focusing can be performed. In the zooming region, focusing from an infinite distance to a predetermined finite distance (a first object distance) can be performed. A second region is a macro region where only focusing on a short-distance object can be performed. In the macro region, focusing to an object distance being shorter than the first object distance can be performed. Further, arrows in the first region indicate the moving loci of the respective lens units during zooming from the wide-angle end to the telephoto end. Arrows in the second region indicate the directions of movements of the respective lens units during macrofocusing from the telephoto end in the first region to the macro end in the second region.

The focusing arrows in the lens cross-sectional views indicate the directions of movements of the respective lens units during focusing from the infinite distance to the minimum object distance.

In the spherical aberration diagrams, a solid-line and a two-dot chain line respectively represent the d-line and the g-line. In the astigmatism diagrams, a solid-line and a broken line respectively represent a meridional image plane and a sagittal image plane at the d-line. Chromatic aberration of magnification (lateral chromatic aberration) is indicated at the g-line. "Fno" represents an F-number, and "ω" represents a half angle of view.

The configurations of the zoom lenses according to the respective exemplary embodiments will be described below.

The zoom lens according to the first exemplary embodiment includes, in order from an object side to an image side, a first lens unit L1 having positive refractive power, a second lens unit L2 having negative refractive power, a third lens unit L3 having positive refractive power, a fourth lens unit L4 having negative refractive power, a fifth lens unit L5 having positive refractive power, a sixth lens unit L6 having negative refractive power, and a seventh lens unit L7 having positive refractive power. A zoom ratio of 2.84 and a maximum photographing magnification of 0.27 times are achieved. Focusing to an object distance, at which the maximum photographing magnification can be achieved, can be performed in the entire zoom region.

The second lens unit L2 corresponds to the lens unit Ln having the largest absolute value of negative refractive power (hereinafter described as "having the highest negative refractive power"). The fourth lens unit L4 corresponds to the lens unit Lm, and the third lens unit L3 corresponds to the lens unit Lm2. A combination of the fifth to seventh lens units L5 to L7 corresponds to the rear lens group Lp having overall positive refractive power in the entire zoom range.

During zooming from the wide-angle end to the telephoto end, the first lens unit L1 and the third to seventh lens units L3 to L7 move toward the object side, and the second lens unit L2 moves with a locus convex toward the image side. During focusing from the infinite distance to the minimum object distance, the second lens unit L2 and the fourth lens unit L4 move toward the object side.

In this exemplary embodiment, a condition (1) concerning the third lens unit L3 and the fourth lens unit L4, which will be described below, is satisfied. Therefore, the power of the fourth lens unit L4 can be heightened without disturbing a power balance against the second lens unit L2 or a power balance against the rear lens group Lp, so that a focus sensitivity is efficiently imparted to the fourth lens unit L4.

Furthermore, a condition (2) to be described below is satisfied at the rear lens group Lp and the fourth lens unit L4, and a condition (3) to be described below is satisfied at the second lens unit L2 and the fourth lens unit L4. Therefore, a focus sensitivity during focusing by the fourth lens unit L4 is set suitably, and hence a high zoom ratio is achieved.

The zoom lens according to the second exemplary embodiment includes, in order from an object side to an image side, a first lens unit L1 having negative refractive power, a second lens unit L2 having positive refractive power, a third lens unit L3 having negative refractive power, a fourth lens unit L4 having positive refractive power, and a fifth lens unit L5 having positive refractive power. A zoom ratio of 2.42 and a maximum photographing magnification of 0.41 times are achieved. Focusing to an object distance, at which the maximum photographing magnification can be achieved, can be performed in the entire zoom region.

The first lens unit L1 corresponds to the lens unit Ln having the largest absolute value of negative refractive power. The third lens unit L3 corresponds to the lens unit Lm, and the second lens unit L2 corresponds to the lens unit Lm2. A combination of the fourth lens unit L4 and the fifth lens unit L5 corresponds to the rear lens group Lp having overall positive refractive power in the entire zoom range.

During zooming from the wide-angle end to the telephoto end, the second to fifth lens units L2 to L5 move toward the object side, and the first lens unit L1 moves with a locus convex toward the image side.

During focusing from the infinite distance to the minimum object distance, the first lens unit L1 and the third lens unit L3 move toward the object side.

By satisfying the condition (1) concerning the second lens unit L2 and the third lens unit L3, the power of the third lens unit L3 can be heightened without disturbing a power balance against the first lens unit L1 or a power balance against the rear lens group Lp. Hence, a focus sensitivity is produced efficiently.

Furthermore, by satisfying the condition (2) to be described below concerning the rear lens group Lp and the third lens unit L3 and by satisfying the condition (3) to be described below concerning the first lens unit L1 and the third lens unit L3, a focus sensitivity during focusing by the third lens unit L3 is set suitably. Hence, a high zoom ratio is achieved.

The zoom lens according to the third exemplary embodiment includes, in order from an object side to an image side, a first lens unit L1 having positive refractive power, a second lens unit L2 having negative refractive power, a third lens unit L3 having positive refractive power, a fourth lens unit L4 having negative refractive power, a fifth lens unit L5 having positive refractive power, a sixth lens unit L6 having negative refractive power, and a seventh lens unit L7 having positive refractive power.

In the zoom lens according to the third exemplary embodiment, a first region, where zooming and focusing can be performed, and a second region (a macro region), where only focusing on a short-distance object can be performed, are established. A zoom ratio at the first region is 2.87.

The second lens unit L2 corresponds to the lens unit Ln having the largest absolute value of negative refractive power. The fourth lens unit L4 corresponds to the lens unit Lm, and the third lens unit L3 corresponds to the lens unit Lm2. A combination of the fifth to seventh lens units L5 to L7 corresponds to the rear lens group Lp having overall positive refractive power in the entire zoom range.

During zooming from the wide-angle end to the telephoto end, the first lens unit L1 and the third to seventh lens units L3 to L7 move toward the object side, and the second lens unit L2 moves with a locus convex toward the image side.

In the first region, during focusing from the infinite distance to a predetermined finite distance (a first object distance), the second lens unit L2 moves toward the object side. In the second region, during macrofocusing from the telephoto end to the macro end, the first lens unit L1 moves toward the image side, and the second to seventh lens units L2 to L7 move toward the object side. In this manner, the rear principal point position of the entire zoom lens is changed efficiently toward the object side to achieve a high photographing magnification. The positional change is made such that the distance between the fourth lens unit L4 and the rear lens group Lp is widened. A maximum photographing magnification in the first region is 0.17 times, and a maximum photographing magnification in the second region is 0.7 times.

By satisfying the condition (1) concerning the third lens unit L3 and the fourth lens unit L4, the power of the fourth lens unit L4 can be heightened without disturbing a power balance against the second lens unit L2 or a power balance against the rear lens group Lp. Hence, the focus sensitivity of the fourth lens unit L4 during the macrofocusing is produced efficiently.

Furthermore, by satisfying the condition (2) to be described below concerning the rear lens group Lp and the fourth lens unit L4 and by satisfying the condition (3) to be described below concerning the second lens unit L2 and the fourth lens unit L4, the focus sensitivity of the fourth lens unit L4 during the macrofocusing is set suitably. Hence, a high zoom ratio is achieved.

Moreover, by satisfying a condition (4) to be described below and by shortening the distance of the movement of the first lens unit L1 entailed by the macrofocusing from the telephoto end to the macro end in the second region, the downsized entire zoom lens is implemented.

The zoom lens according to the fourth exemplary embodiment includes, in order from an object side to an image side, a first lens unit L1 having positive refractive power, a second lens unit L2 having negative refractive power, a third lens unit L3 having positive refractive power, a fourth lens unit L4 having negative refractive power, a fifth lens unit L5 having positive refractive power, a sixth lens unit L6 having negative refractive power, and a seventh lens unit L7 having positive refractive power.

In the zoom lens according to the fourth exemplary embodiment, a first region, where zooming and focusing can be performed, and a second region (a macro region), where only focusing on a short-distance object can be performed, are established. A zoom ratio in the first region is 2.84.

The second lens unit L2 corresponds to the lens unit Ln having the largest absolute value of negative refractive power. The fourth lens unit L4 corresponds to the lens unit Lm, and the third lens unit L3 corresponds to the lens unit Lm2. A combination of the fifth to seventh lens units L5 to L7 corresponds to the rear lens group Lp having overall positive refractive power in the entire zoom range.

During zooming from the wide-angle end to the telephoto end, the first lens unit L1 and the third to seventh lens units L3 to L7 move toward the object side, and the second lens unit L2 moves with a locus convex toward the image side.

In the first region, during focusing from the infinite distance to a predetermined finite distance (a first object distance), the second lens unit L2 moves toward the object side. In the second region, during macrofocusing from the telephoto end to the macro end, the first lens unit L1 moves toward the image side, and the second to seventh lens units L2 to L7 move toward the object side. As a result, the rear principal point position of the entire zoom lens is efficiently changed toward the object side to achieve a high photographing magnification. The positional change is made such that the distance between the fourth lens unit L4 and the rear lens group Lp is widened. A maximum photographing magnification in the first region is 0.17 times, and a maximum photographing magnification in the second region is 0.6 times.

By satisfying the condition (1) concerning the third lens unit L3 and the fourth lens unit L4, the power of the fourth lens unit L4 can be heightened without disturbing a power balance against the second lens unit L2 or a power balance against the rear lens group Lp. Hence, the focus sensitivity of the fourth lens unit L4 during macrofocusing is produced efficiently.

Furthermore, by satisfying the condition (2) to be described below concerning the rear lens group Lp and the fourth lens unit L4 and by satisfying the condition (3) to be described below concerning the second lens unit L2 and the fourth lens unit L4, the focus sensitivity of the fourth lens unit L4 during macrofocusing is set suitably. Hence, a high zoom ratio is achieved.

Moreover, by satisfying the condition (4) to be described below and by shortening the distance of the movement of the first lens unit L1 entailed by macrofocusing from the telephoto end to the macro end in the second region, the downsized entire zoom lens is implemented.

The zoom lens according to the fifth exemplary embodiment includes, in order from an object side to an image side, a first lens unit L1 having negative refractive power, a second lens unit L2 having positive refractive power, a third lens unit L3 having negative refractive power, a fourth lens unit L4 having positive refractive power, a fifth lens unit L5 having negative refractive power, and a sixth lens unit L6 having positive refractive power.

In the zoom lens according to the fifth exemplary embodiment, a first region, where zooming and focusing can be performed, and a second region (a macro region), where only focusing on a short-distance object can be performed, are established. A zoom ratio in the first region is 3.42.

The first lens unit L1 corresponds to the lens unit Ln having the largest absolute value of negative refractive power. The third lens unit L3 corresponds to the lens unit Lm, and the second lens unit L2 corresponds to the lens unit Lm2. A combination of the fourth to sixth lens units L4 to L6 corresponds to the rear lens group Lp having overall positive refractive power in the entire zoom range.

During zooming from the wide-angle end to the telephoto end, the second to sixth lens units L2 to L6 move toward the object side, and the first lens unit L1 moves with a locus convex toward the image side. In the first region, during focusing from the infinite distance to a predetermined finite distance (a first object distance), the first lens unit L1 moves toward the object side. In the second region, during macrofocusing from the telephoto end to the macro end, the first to sixth lens units L1 to L6 move toward the object side. In this manner, the rear principal point position of the entire zoom lens is efficiently changed toward the object side to achieve a high photographing magnification. The positional change is made such that the distance between the third lens unit L3 (Lm) and the rear lens group Lp is widened. A maximum photographing magnification in the first region is 0.17 times, and a maximum photographing magnification in the second region is 0.7 times.

By satisfying the condition (1) concerning the second lens unit L2 and the third lens unit L3, the power of the third lens unit L3 can be heightened without disturbing a power balance against the first lens unit L1 or a power balance against the rear lens group Lp. Hence, the focus sensitivity of the third lens unit L3 during macrofocusing is produced efficiently.

Furthermore, by satisfying the condition (2) to be described below concerning the rear lens group Lp and the third lens unit L3 and by satisfying the condition (3) to be described below concerning the first lens unit L1 and the third lens unit L3, the focus sensitivity of the third lens unit L3 during macrofocusing is set suitably. Hence, a high zoom ratio is achieved.

In U.S. Patent Application Publication No. 2011/0116174, during focusing from an infinite distance to a minimum object distance, the second lens unit having negative refractive power moves toward the object side. During focusing at a telephoto end, the second lens unit moves toward the object side, and hence the distance between the first lens unit and the second lens unit becomes narrow. Thus, the magnification of the zoom lens is reduced. Because of this, short-distance photographing magnification is lowered, and it becomes difficult to raise the photographing magnification.

Furthermore, to perform shorter-distance focusing at a wide-angle end, it is necessary to provide a distance between the first lens unit and the second lens unit by the distance of the movement of the focusing lens unit. Because of this, the effective diameter of the first lens unit tends to be increased considerably, or refractive power settings at a wide-angle end have tended to become inappropriate at a wide angle of view. Further, spherical aberration variation at a telephoto end tends to widen.

In Japanese Patent Application Laid-Open No. 2000-047107, focusing from an infinite distance to a minimum object distance is performed by moving the fourth lens unit toward the object side and by moving the sixth lens unit toward the image side. However, there is a necessity to provide distances by the distances of movements entailed by the focusing aside from zooming, and hence the entire zoom lens tends to be upsized. Further, the focus sensitivity of the fourth lens unit tends to lower, and the distance of movement of the sixth lens unit tends to increase.

In Japanese Patent Application Laid-Open No. 11-352402, in normal mode in which zooming and focusing are to be performed independently, minimum-object-distance focusing can be performed by moving the third lens unit toward the image side in the entire zoom region from the wide-angle end to the telephoto end. During macrofocusing, although at a single focal length, a high photographing magnification is achieved by re-disposing the lens units for macrophotographing.

In macrofocusing described in Japanese Patent Application Laid-Open No. 11-352402, an increase in photographing magnification is facilitated by simply moving the first lens unit forward to make the zoom lens suitable for further telephotographing. In such a method, a macro effect is obtained by merely lowering the potential of the zoom lens, i.e., high magnification is not achieved efficiently.

In the zoom lenses according to the respective exemplary embodiments of the present invention, the lens unit Ln having the highest negative refractive power of all the lens units moves during focusing, and hence the distances of the movements of the other lens units during the focusing can be made short. Further, in the third, fourth, and fifth exemplary embodiments, by moving the lens unit Lm having the high focus sensitivity during macrofocusing, shorter-distance focusing can be performed, and a high photographing magnification can be achieved easily. That is, a focusing method can be used in which, unlike the fourth lens unit discussed in Japanese Patent Application Laid-Open No. 2000-047107, a sufficient focus effect can be obtained using the lens unit Lm alone and in which the degree of magnification reduction is small. By using such a method, widening of the distance between the first lens unit and the second lens unit and magnification reduction are suppressed while achieving high refractive power, which is an advantage of U.S. Patent Application Publication No. 2011/0116174.

In the zoom lenses according to the exemplary embodiments, on the image side of the lens unit Ln having the highest negative refractive power, the lens unit Lm having negative refractive power and the rear lens group Lp including all the other lens units on the image side of the lens unit Lm and having combined positive refractive power are provided in order from the object side to the image side. During focusing from the infinite distance to the minimum object distance or during macrofocusing from the telephoto end to the macro end, the lens unit Ln moves toward the object side, and the lens unit Lm moves toward the object side such that the distance between the lens unit Lm and the rear lens group Lp widens.

Between the lens unit Ln and the rear lens group Lp, an intense light flux is diverged from the object side to the image side. When the lens unit Lm is disposed therebetween, the incident height h of the on-axis ray varies considerably depending on the position of the lens unit Lm, and the magnification of the lens unit Lm changes. As a result of this, focusing effect is obtained at the lens unit Lm. Consequently, the distance of the movement of the lens unit Ln can be made short while enabling focusing on a shorter-distance object. Further, focusing on a shorter-distance object can be performed without damaging the potential of the zoom lens for zooming, and a high magnification is achieved.

Next, more desirable conditions will be described. It is desirable that the following condition be satisfied:

$$0.65 < |F_{Lm}/F_{Lm2}| < 1.50 \quad (1)$$

where $F_{Lm}$ is the focal length of the lens unit Lm, and the $F_{Lm2}$ is the focal length of the lens unit Lm2.

In the above exemplary embodiments, the lens unit Lm2 having positive refractive power is disposed between the lens unit Ln and the lens unit Lm. When only the lens unit Lm is disposed between the rear lens group Lp and the lens unit Ln, by making the refractive power of the lens unit Lm too high, the principal point position of a lens unit having negative refractive power obtained by combining the lens unit Lm with the lens unit Ln changes toward the image side, and hence it is difficult to form a wide angle of view. Therefore, the lens unit Lm2 having positive refractive power is disposed to heighten the power of the lens unit Lm and the power of the lens unit Ln. Hence, it becomes easy to heighten the focus sensitivity of the lens unit Lm more efficiently without changing the power settings at the rear lens group Lp and the lens unit Ln.

Specifically, with respect to the relationship between the power of the lens unit Lm and the power of the lens unit Lm2, it is desirable that the condition (3) be satisfied. By satisfying the condition (3), the focus sensitivity of the lens unit Lm can be heightened efficiently without changing power settings at the rear lens group Lp and the lens unit Ln.

Where the condition (1) is not satisfied, the absolute value of the refractive power of a combination of the lens unit Lm and the lens unit Lm2 becomes too large. Therefore, it becomes difficult to obtain a back focus at the wide-angle end because the principal point position of the rear lens group Lp is too close to the object side, or it becomes difficult to obtain a wide photographing angle of view at the wide-angle end because the principal point position of the lens unit Ln is too close to the image side.

It is more desirable that the range of the ratio of $F_{Lm}$ to $F_{Lm2}$ in the condition (1) be set as follows:

$$0.7 < |F_{Lm}/F_{Lm2}| < 1.2 \quad (1a)$$

In the above exemplary embodiments, it is further desirable to satisfy one or more of the conditions below. The focal length of the rear lens group Lp at the wide-angle end is represented as $F_{Lp}$. The focal length of the lens unit Ln is represented as $F_{Ln}$. The lens configuration length of the entire zoom lens at the time of achieving a maximum photographing magnification is represented as TLDm, and the lens configuration length of the entire zoom lens at the telephoto end during focusing on an infinite-distance object is represented as TLDt.

Incidentally, "the time of achieving a maximum photographing magnification" refers to the time when focusing on a minimum object distance has been performed at the telephoto end. On the other hand, in the zoom lens in which the first region, where zooming and focusing can be performed, and the second region, where only focusing on a short-distance object can be performed, are established, "the time of achieving a maximum photographing magnification" refers to the time when focusing on the shortest distance has been performed at the macro end in the second region. In that case, it is desirable that one or more of the following conditions be satisfied:

$$0.5 < |F_{Lp}/F_{Lm}| < 1.0 \quad (2)$$

$$0.3 < |F_{Ln}/F_{Lm}| < 1.0 \quad (3)$$

$$0.6 < |TLDm/TLDt| < 1.2 \quad (4)$$

Next, the technical meanings of the conditions will be described.

The condition (2) is for suitably setting the refractive power of the rear lens group Lp and the refractive power of the lens unit Lm and to efficiently produce the focus sensitivity at the lens unit Lm without reducing the zooming effect of the zoom lens. When the ratio exceeds the upper limit in the condition (2), a zooming effect between the rear lens group Lp and the lens unit Ln is reduced because the power of the rear lens group Lp is too weak, and it becomes difficult to achieve zooming ratios efficiently. When the ratio falls below the lower limit in the condition (2), it becomes difficult to produce a sufficient focus sensitivity because the power of the lens unit Lm is too weak. It is more desirable that the ratio of $F_{Lp}$ to $F_{Lm}$ in the condition (2) be set as follows:

$$0.6 < |F_{Lp}/F_{Lm}| < 0.9 \quad (2a)$$

The condition (3) is for suitably setting the power of the lens unit Ln and the power of the lens unit Lm and to suitably produce focus sensitivity at the lens unit Ln and the lens unit Lm without reducing the zooming effect of the zoom lens. When the ratio exceeds the upper limit in the condition (3), zooming effect between the lens unit Lm and the rear lens group Lp is reduced because the power of the lens unit Ln is too weak. Hence, it becomes difficult to achieve zooming ratios efficiently, and the focus sensitivity of the lens unit Ln is reduced.

When the ratio falls below the lower limit in the condition (3), it becomes difficult to produce sufficient focus sensitivity because the power of the lens unit Lm is too weak conversely. Therefore, it is more desirable to set the ratio in the condition (2) as follows:

$$0.4 < |F_{Ln}/F_{Lm}| < 0.9 \quad (3a)$$

When the efficient achievement of a wide angle of view is sought in the above exemplary embodiments, a negative lead type zoom lens can be used, in which the lens unit Ln is closest to the object side. Further, when the efficient achievement of zooming effect is sought, a positive lead type zoom lens may be used, in which another lens unit having positive refractive power is disposed on the object side of the lens unit Ln.

In the positive lead type, it is desirable that the condition (4) be satisfied. The condition (4) is for making the lens configuration length at the time of achieving a maximum photographing magnification equal to or slightly shorter than the lens configuration length (a distance from the first lens surface to the last lens surface) at the telephoto end. When the ratio exceeds the upper limit in the condition (4), a zoom ratio cannot be achieved efficiently because the distance of the forward movement of the first lens unit is reduced in the entire zoom region. Further, when the ratio falls below the lower limit in the condition (4), photographing magnification during focusing on a short-distance object is lowered, which is not desirable. It is more desirable that the ratio in the condition (4) be set as follows:

$$0.9 < |TLDm/TLDt| < 1.1 \quad (4a)$$

In the zoom lenses in which the first region, where zooming and focusing can be performed, and the second region (the macro region), where only focusing on a short-distance object can be performed, are established, by moving not only the lens unit Ln and the lens unit Lm but the rear lens group Lp toward the object side during macrofocusing, the principal point position of the entire zoom lens changes toward the object side, and hence focusing on the short-distance object can be performed efficiently.

The zoom lenses according to the exemplary embodiments are applicable to an optical apparatus such as an image pickup apparatus and an image projector. From the foregoing descriptions, it is clear that a zoom lens can be implemented that can perform focusing on a short-distance object in addition to having a simple lens configuration, the downsizing of the entire zoom lens, and being powerful.

Next, Numerical Examples 1 to 5, which respectively correspond to the first to fifth exemplary embodiments of the present invention, will be presented. In the numerical examples, each i denotes the number of a surface counted from the object side. Each ri denotes a radius of curvature of an i-th surface, and each di denotes the distance between an i-th surface and an (i+1)th surface. Each ndi and each vdi respectively denote the refractive index of a material of the lens and the value of an Abbe number with respect to the d-line ($\lambda$=587.6 nm). A total lens length refers to a distance from the first surface to the image plane. BF denotes a back focus, i.e., a distance from the final surface to the image plane.

K, A4, A6, A8, A10, and A12 each denote an aspheric surface coefficient. When it is assumed that a point of intersection between a lens surface and an optical axis is an origin and that the traveling direction of light is the positive direction, the shape of each aspheric surface is expressed by the following expression:

$$X = \frac{(1/R)H^2}{1 + \sqrt{1 - (1+K)(H/R)^2}} + A4 \times H^4 + +A6 \times H^6 + A8 \times H^8 + A10 \times H^{10} + A12 \times H^{12}$$

where X is a position in the direction of the optical axis, H is a position in the direction perpendicular to the optical axis, and R is a paraxial radius of curvature. In addition, "e-0X" means "$\times 10^{-x}$". Portions where the distance d between two optical surfaces is represented as "variable" each refer to a distance d that changes during zooming in the first focusing region, or a distance d that changes during focusing on a minimum object distance in the second focusing region. Surface distances d corresponding to focal lengths are listed in the following table. Further, the relationships between the foregoing conditions and the numerical examples are listed in Table 1.

With the macro end in the second region, the reason why a distance d11 in Numerical Example 3 and a distance d6 in Numerical Example 5 are presented as negative numerical values is that numerical values obtained during infinite-distance focusing are presented for the sake of convenience. This means that in the second regions in Numerical Examples 3 and 5, it is physically impossible to perform infinite-distance focusing, i.e., the movement of the lens unit Ln to the infinite distance is restricted and the subsequent lens units are moved toward the object side.

Numerical Example 1

Unit: mm

Surface Data

| Surface Number | r | d | nd | vd | Effective Diameter |
|---|---|---|---|---|---|
| 1 | 244.324 | 2.00 | 1.84666 | 23.8 | 66.22 |
| 2 | 79.885 | 6.44 | 1.77250 | 49.6 | 63.14 |
| 3 | 338.133 | 0.15 | | | 62.49 |
| 4 | 54.941 | 6.11 | 1.80400 | 46.6 | 57.56 |
| 5 | 121.979 | (Variable) | | | 56.37 |
| 6* | 91.789 | 1.80 | 1.77250 | 49.6 | 34.57 |
| 7 | 14.676 | 8.79 | | | 24.22 |
| 8 | −38.026 | 1.30 | 1.77250 | 49.6 | 23.83 |
| 9 | 28.668 | 0.36 | | | 23.41 |
| 10 | 28.195 | 5.40 | 1.80518 | 25.4 | 23.71 |
| 11 | −86.182 | (Variable) | | | 23.50 |
| 12 | 35.977 | 3.68 | 1.64769 | 33.8 | 17.91 |
| 13 | −113.570 | (Variable) | | | 18.04 |
| 14 | −45.709 | 1.00 | 1.84666 | 23.8 | 18.03 |
| 15 | 155.575 | (Variable) | | | 18.43 |
| 16(Stop) | ∞ | 0.00 | | | (Variable) |
| 17 | 29.969 | 6.04 | 1.59282 | 68.6 | 20.84 |
| 18 | −47.460 | 0.15 | | | 20.80 |
| 19 | 35.221 | 6.06 | 1.49700 | 81.5 | 19.99 |
| 20 | −23.423 | 1.00 | 1.90366 | 31.3 | 18.98 |
| 21 | −87.348 | (Variable) | | | 18.72 |
| 22 | −4655.341 | 0.90 | 1.80100 | 35.0 | 16.30 |
| 23 | 19.245 | 2.63 | 1.84666 | 23.8 | 15.90 |
| 24 | 46.366 | (Variable) | | | 15.91 |
| 25 | 224.681 | 2.58 | 1.85400 | 40.4 | 19.01 |
| 26* | −126.855 | | | | 19.67 |

Aspheric Surface Data

6th Surface

K = 0.00000e+000 A4 = 7.14991e−006 A6 = −8.99245e−009
A8 = 4.15505e−012 A10 = 8.58219e−015 A12 = −1.34006e−017

26th Surface

K = 0.00000e+000 A4 = 1.88957e−005 A6 = 3.38585e−009
A8 = 4.18299e−010 A10 = −1.57339e−012

Various Data
Zoom Ratio: 2.84

| | Wide-Angle | Middle | Telephoto |
|---|---|---|---|
| Focal Length | 24.30 | 35.00 | 69.00 |
| F-number | 4.10 | 4.10 | 4.10 |
| Half Angle of view (Degree) | 41.68 | 31.72 | 17.41 |
| Image Height | 21.64 | 21.64 | 21.64 |
| Total Lens Length | 132.39 | 136.29 | 164.85 |
| BF | 39.32 | 48.63 | 60.76 |
| d5 | 2.29 | 6.14 | 31.47 |
| d11 | 19.26 | 10.00 | 1.10 |
| d13 | 3.76 | 4.34 | 4.26 |
| d15 | 4.27 | 3.69 | 3.77 |
| d21 | 1.20 | 3.10 | 5.60 |
| d24 | 5.90 | 4.00 | 1.50 |
| ea16 | 13.79 | 16.37 | 20.00 |

Zoom Lens Unit Data

| Unit | Start Surface | Focal Length | Lens Configuration Length | Front Principal Point Position | Rear Principal Point Position |
|---|---|---|---|---|---|
| 1 | 1 | 116.93 | 14.70 | 0.75 | −7.36 |
| 2 | 6 | −18.98 | 17.65 | 1.60 | −12.77 |
| 3 | 12 | 42.60 | 3.68 | 0.54 | −1.71 |
| 4 | 14 | −41.63 | 1.00 | 0.12 | −0.42 |
| 5 | 16 | 25.67 | 13.25 | 1.42 | −7.07 |
| 6 | 22 | −62.48 | 3.53 | 2.12 | 0.19 |
| 7 | 25 | 95.26 | 2.58 | 0.89 | −0.50 |

Numerical Example 2

Unit: mm

Surface Data

| Surface Number | r | d | nd | vd | Effective Diameter |
|---|---|---|---|---|---|
| 1 | 60.472 | 4.77 | 1.60311 | 60.6 | 46.69 |
| 2 | 285.137 | 0.90 | | | 45.41 |
| 3 | 32.155 | 1.45 | 1.83481 | 42.7 | 32.90 |
| 4 | 16.775 | 8.00 | | | 26.49 |
| 5 | −81.988 | 1.20 | 1.77250 | 49.6 | 25.77 |
| 6 | 20.229 | 4.57 | | | 22.83 |
| 7 | 25.856 | 4.72 | 1.80518 | 25.4 | 23.22 |
| 8 | 1057.920 | 1.10 | 1.80400 | 46.6 | 22.45 |
| 9 | 60.963 | (Variable) | | | 21.68 |
| 10 | 84.795 | 2.04 | 1.60311 | 60.6 | 11.89 |
| 11 | −29.075 | (Variable) | | | 12.01 |
| 12 | −28.863 | 0.70 | 1.83400 | 37.2 | 11.74 |
| 13 | 140.037 | (Variable) | | | 11.99 |
| 14 | 26.627 | 2.86 | 1.63854 | 55.4 | 13.15 |
| 15 | −88.843 | 1.26 | | | 13.10 |
| 16(Stop) | ∞ | 2.00 | | | 12.92 |
| 17 | 22.681 | 3.77 | 1.60311 | 60.6 | 12.84 |
| 18 | −42.787 | 0.75 | 1.85026 | 32.3 | 12.28 |
| 19 | −442.053 | 2.83 | | | 12.09 |
| 20 | −34.449 | 0.70 | 1.74950 | 35.3 | 11.31 |
| 21 | 22.950 | 1.71 | 1.84666 | 23.8 | 11.36 |
| 22 | 32.982 | (Variable) | | | 11.47 |
| 23* | 125.415 | 3.41 | 1.58313 | 59.4 | 13.91 |
| 24 | −21.604 | (Variable) | | | 15.38 |

Aspheric Surface Data

23rd Surface

K = 0.00000e+000 A4 = −4.18951e−005 A6 = 1.10198e−008
A8 = −3.16464e−009 A10 = 8.52289e−011 A12 = −7.29854e−013

Various Data
Zoom Ratio: 2.42

| | Wide-Angle | Middle | Telephoto |
|---|---|---|---|
| Focal Length | 18.60 | 24.00 | 44.95 |
| F-number | 3.59 | 4.02 | 5.88 |
| Half Angle of view (Degree) | 36.29 | 29.65 | 16.90 |
| Image Height | 13.66 | 13.66 | 13.66 |
| Focal Length | 113.56 | 111.58 | 123.50 |

-continued

Unit: mm

| | | | |
|---|---|---|---|
| BF | 35.55 | 41.93 | 66.70 |
| d9 | 20.69 | 12.99 | 1.59 |
| d11 | 1.82 | 2.36 | 3.65 |
| d13 | 3.36 | 2.82 | 1.54 |
| d22 | 3.40 | 2.75 | 1.30 |

Zoom Lens Unit Data

| Unit | Start Surface | Focal Length | Lens Configuration Length | Front Principal Point Position | Rear Principal Point Position |
|---|---|---|---|---|---|
| 1 | 1 | −24.54 | 26.71 | 11.17 | −10.46 |
| 2 | 10 | 36.14 | 2.04 | 0.95 | −0.33 |
| 3 | 12 | −28.64 | 0.70 | 0.07 | −0.32 |
| 4 | 14 | 36.24 | 15.87 | −12.34 | −17.59 |
| 5 | 23 | 31.88 | 3.41 | 1.85 | −0.32 |

Numerical Example 3

Unit: mm

Surface Data

| Surface Number | r | d | nd | vd | Effective Diameter |
|---|---|---|---|---|---|
| 1 | 244.270 | 2.00 | 1.84666 | 23.8 | 64.01 |
| 2 | 77.817 | 6.51 | 1.77250 | 49.6 | 60.60 |
| 3 | 520.807 | 0.15 | | | 59.92 |
| 4 | 54.708 | 5.10 | 1.83481 | 42.7 | 54.21 |
| 5 | 102.370 | | | | 52.93 |
| 6* | 106.449 | 1.80 | 1.80400 | 46.6 | 34.29 |
| 7 | 14.914 | 8.77 | | | 24.39 |
| 8 | −37.374 | 1.30 | 1.77250 | 49.6 | 23.98 |
| 9 | 29.028 | 0.15 | | | 23.30 |
| 10 | 27.566 | 5.50 | 1.80518 | 25.4 | 23.47 |
| 11 | −79.270 | (Variable) | | | 23.25 |
| 12 | 33.816 | 3.47 | 1.62588 | 35.7 | 18.39 |
| 13 | −61.868 | (Variable) | | | 18.48 |
| 14 | −31.637 | 1.00 | 1.84666 | 23.8 | 18.08 |
| 15 | −1969.479 | (Variable) | | | 18.59 |
| 16(Stop) | ∞ | 2.00 | | | (Variable) |
| 17 | 41.800 | 5.33 | 1.59282 | 68.6 | 20.52 |
| 18 | −37.861 | 0.15 | | | 20.66 |
| 19 | 50.346 | 5.96 | 1.49700 | 81.5 | 20.00 |
| 20 | −20.733 | 1.00 | 1.90366 | 31.3 | 19.21 |
| 21 | −50.842 | (Variable) | | | 19.19 |
| 22 | −616.897 | 0.90 | 1.80100 | 35.0 | 15.94 |
| 23 | 20.095 | 2.57 | 1.84666 | 23.8 | 15.87 |
| 24 | 47.987 | (Variable) | | | 15.88 |
| 25 | 267.996 | 2.77 | 1.85400 | 40.4 | 20.92 |
| 26* | −105.715 | | | | 21.61 |

Aspheric Surface Data

6th Surface

K = 0.00000e+000 A4 = 7.48366e−006 A6 = −9.07746e−009
A8 = −6.82116e−013 A10 = 1.96862e−014 A12 = −2.37851e−017

26th Surface

K = 0.00000e+000 A4 = 1.23491e−005 A6 = −4.96603e−009
A8 = 2.44298e−010 A10 = −7.85907e−013

Various Data
Zoom Ratio: 2.84

1st Region

| | Wide- | | | 2nd Region | |
|---|---|---|---|---|---|
| | Angle | Middle | Telephoto | Minimum | Macro |

-continued

Unit: mm

| | | | | | |
|---|---|---|---|---|---|
| Focal Length | 24.30 | 35.10 | 69.00 | 67.23 | 60.62 |
| F-number | 4.10 | 4.10 | 4.10 | 5.28 | 5.56 |
| Half Angle of view (Degree) | 41.68 | 31.65 | 17.41 | 17.84 | 19.64 |
| Image Height | 21.64 | 21.64 | 21.64 | 21.64 | 21.64 |
| Total Lens Length | 134.65 | 141.04 | 164.94 | 162.09 | 152.75 |
| BF | 39.15 | 46.02 | 59.68 | 64.95 | 67.73 |
| d5 | 2.93 | 11.21 | 31.69 | 26.37 | 14.86 |
| d11 | 20.10 | 11.33 | 1.10 | −1.70 | −2.31 |
| d13 | 4.37 | 4.84 | 4.85 | 2.25 | 1.76 |
| d15 | 1.95 | 1.49 | 1.48 | 4.07 | 4.56 |
| d21 | 1.20 | 3.79 | 8.23 | 7.50 | 8.23 |
| d24 | 8.53 | 5.94 | 1.50 | 2.23 | 1.50 |
| ea16 | 13.30 | 15.16 | 19.19 | 15.43 | 15.21 |

Zoom Lens Unit Data

| Unit | Start Surface | Focal Length | Lens Configuration Length | Front Principal Point Position | Rear Principal Point Position |
|---|---|---|---|---|---|
| 1 | 1 | 118.64 | 13.76 | 0.67 | −6.87 |
| 2 | 6 | −18.71 | 17.52 | 1.42 | −12.76 |
| 3 | 12 | 35.43 | 3.47 | 0.76 | −1.40 |
| 4 | 14 | −37.99 | 1.00 | −0.01 | −0.55 |
| 5 | 16 | 27.19 | 14.44 | 4.27 | −5.90 |
| 6 | 22 | −60.04 | 3.47 | 1.93 | 0.04 |
| 7 | 25 | 89.08 | 2.77 | 1.07 | −0.42 |

Numerical Example 4

Unit: mm

Surface Data

| Surface Number | r | d | nd | vd | Effective Diameter |
|---|---|---|---|---|---|
| 1 | 198.785 | 2.00 | 1.84666 | 23.8 | 56.29 |
| 2 | 69.696 | 5.45 | 1.77250 | 49.6 | 51.45 |
| 3 | 359.221 | 0.15 | | | 50.06 |
| 4 | 46.783 | 4.42 | 1.77250 | 49.6 | 42.27 |
| 5 | 107.035 | (Variable) | | | 41.19 |
| 6* | 113.860 | 1.60 | 1.88300 | 40.8 | 31.79 |
| 7 | 14.923 | 7.35 | | | 23.29 |
| 8 | −50.320 | 1.20 | 1.88300 | 40.8 | 22.94 |
| 9 | 30.250 | 0.15 | | | 22.23 |
| 10 | 27.615 | 6.31 | 1.80518 | 25.4 | 22.41 |
| 11 | −32.652 | 1.10 | 1.77250 | 49.6 | 22.23 |
| 12 | −102.403 | (Variable) | | | 21.86 |
| 13 | 29.398 | 3.13 | 1.72047 | 34.7 | 16.90 |
| 14 | −82.282 | (Variable) | | | 16.79 |
| 15 | −30.261 | 0.90 | 1.84666 | 23.8 | 15.95 |
| 16 | 917.764 | (Variable) | | | 16.08 |
| 17(Stop) | ∞ | 1.50 | | | 16.54 |
| 18 | 52.353 | 3.48 | 1.59282 | 68.6 | 16.70 |
| 19 | −30.468 | 0.15 | | | 16.69 |
| 20 | 30.154 | 4.34 | 1.49700 | 81.5 | 15.85 |
| 21 | −23.153 | 0.90 | 1.90366 | 31.3 | 15.00 |
| 22 | −60.133 | (Variable) | | | 14.72 |
| 23 | −299.625 | 0.80 | 1.83481 | 42.7 | 13.82 |
| 24 | 22.008 | 1.85 | 1.84666 | 23.8 | 13.30 |
| 25 | 38.425 | (Variable) | | | 13.16 |
| 26 | 624.093 | 2.36 | 1.85400 | 40.4 | 17.14 |
| 27* | −162.823 | | | | 17.84 |

Aspheric Surface Data

6th Surface

K = 0.00000e+000 A4 = 4.95365e−006 A6 = −7.83369e−009
A8 = 1.79042e−012 A10 = 2.63740e−014 A12 = −5.16279e−017

17
-continued

Unit: mm

27th Surface

K = 0.00000e+000 A4 = 1.92991e-005 A6 = 1.90581e-008
A8 = 3.02065e-010 A10 = -1.11865e-012

Various Data
Zoom Ratio: 3.42

| | | | | | |
|---|---|---|---|---|---|
| Focal Length | 24.30 | 35.10 | 82.99 | 68.22 | 64.03 |
| F-number | 3.58 | 4.42 | 5.89 | 5.92 | 5.87 |
| Half Angle of view (Degree) | 41.68 | 31.65 | 14.61 | 17.60 | 18.67 |
| Image Height | 21.64 | 21.64 | 21.64 | 21.64 | 21.64 |
| Total Lens Length | 126.64 | 128.32 | 155.92 | 149.57 | 148.58 |
| BF | 39.39 | 49.31 | 64.14 | 65.59 | 65.96 |

| 1st Region | | | 2nd Region | |
|---|---|---|---|---|
| Wide-Angle | Middle | Telephoto | Minimum | Macro |
| d5 | 2.38 | 3.96 | 27.87 | 19.81 | 17.58 |
| d12 | 22.06 | 12.25 | 1.10 | 1.37 | 2.23 |
| d14 | 3.97 | 3.98 | 3.73 | 1.96 | 1.93 |
| d16 | 1.53 | 1.53 | 1.78 | 3.55 | 3.58 |
| d22 | 1.20 | 2.90 | 6.66 | 5.89 | 5.13 |
| d25 | 6.96 | 5.26 | 1.50 | 2.28 | 3.04 |

Zoom Lens Unit Data

| Unit | Start Surface | Focal Length | Lens Configuration Length | Front Principal Point Position | Rear Principal Point Position |
|---|---|---|---|---|---|
| 1 | 1 | 94.77 | 12.01 | 1.24 | -5.48 |
| 2 | 6 | -16.73 | 17.71 | 1.20 | -12.38 |
| 3 | 13 | 30.42 | 3.13 | 0.48 | -1.36 |
| 4 | 15 | -34.59 | 0.90 | 0.02 | -0.47 |
| 5 | 17 | 22.76 | 10.37 | 3.21 | -4.06 |
| 6 | 23 | -41.06 | 2.65 | 1.29 | -0.14 |
| 7 | 26 | 151.42 | 2.36 | 1.01 | -0.26 |

Numerical Example 5

Unit: mm

Surface Data

| Surface Number | r | d | nd | vd | Effective Diameter |
|---|---|---|---|---|---|
| 1* | 60.752 | 1.80 | 1.48749 | 70.2 | 39.59 |
| 2 | 16.615 | 10.98 | | | 29.43 |
| 3 | -62.412 | 1.30 | 1.80400 | 46.6 | 29.02 |
| 4 | 33.827 | 1.46 | | | 27.28 |
| 5 | 38.115 | 5.09 | 1.75520 | 27.5 | 27.47 |
| 6 | -163.919 | (Variable) | | | 27.00 |
| 7 | 33.384 | 2.77 | 1.58313 | 59.4 | 18.13 |
| 8 | -134.419 | (Variable) | | | 18.05 |
| 9 | -41.566 | 1.00 | 1.91082 | 35.3 | 17.84 |
| 10 | -10207.879 | (Variable) | | | 18.06 |
| 11(Stop) | ∞ | 2.00 | | | 18.92 |
| 12 | 29.694 | 4.66 | 1.59282 | 68.6 | 20.39 |
| 13 | -50.762 | 0.15 | | | 20.31 |
| 14 | 30.222 | 4.87 | 1.49700 | 81.5 | 19.44 |
| 15 | -32.918 | 1.00 | 1.90366 | 31.3 | 18.61 |
| 16 | -168.309 | (Variable) | | | 18.20 |
| 17 | 169.843 | 0.90 | 1.80100 | 35.0 | 13.84 |
| 18 | 15.404 | 2.42 | 1.84666 | 23.8 | 13.41 |
| 19 | 31.151 | (Variable) | | | 13.34 |
| 20 | 242.197 | 2.20 | 1.85400 | 40.4 | 15.69 |
| 21* | -1299.657 | | | | 16.30 |

18
-continued

Unit: mm

Aspheric Surface Data

1st Surface

K = 0.00000e+000 A4 = 7.98108e-006 A6 = 2.06752e-009
A8 = -2.22927e-012 A10 = 1.59653e-014 A12 = -1.90985e-018

21st Surface

K = 0.00000e+000 A4 = 2.88036e-005 A6 = 5.42766e-008
A8 = 4.78099e-010 A10 = -2.33568e-012

Various Data
Zoom Ratio: 2.84

| | | | | | |
|---|---|---|---|---|---|
| Focal Length | 24.30 | 35.00 | 60.00 | 64.36 | 69.08 |
| F-number | 3.60 | 4.27 | 5.87 | 6.26 | 6.64 |
| Half Angle of view (Degree) | 41.68 | 31.72 | 19.83 | 18.58 | 17.39 |
| Image Height | 21.64 | 21.64 | 21.64 | 21.64 | 21.64 |
| Total Lens Length | 120.53 | 117.43 | 127.28 | 129.34 | 133.40 |
| BF | 39.61 | 49.44 | 72.30 | 77.31 | 82.31 |

| 1st Region | | | 2nd Region | |
|---|---|---|---|---|
| Wide-Angle | Middle | Telephoto | Minimum | Macro |
| d6 | 27.04 | 14.11 | 1.10 | -1.85 | -2.80 |
| d8 | 3.07 | 3.79 | 3.79 | 1.85 | 1.86 |
| d10 | 2.22 | 1.50 | 1.50 | 3.44 | 3.42 |
| d16 | 1.20 | 2.35 | 4.49 | 4.27 | 4.20 |
| d19 | 4.79 | 3.64 | 1.50 | 1.72 | 1.79 |

Zoom Lens Unit Data

| Unit | Start Surface | Focal Length | Lens Configuration Length | Front Principal Point Position | Rear Principal Point Position |
|---|---|---|---|---|---|
| 1 | 1 | -30.25 | 20.62 | 3.59 | -13.91 |
| 2 | 7 | 46.14 | 2.77 | 0.35 | -1.41 |
| 3 | 9 | -45.83 | 1.00 | -0.00 | -0.53 |
| 4 | 11 | 24.52 | 12.68 | 3.11 | -5.72 |
| 5 | 17 | -52.17 | 3.32 | 2.49 | 0.65 |
| 6 | 20 | 239.21 | 2.20 | 0.19 | -1.00 |

TABLE 1

| | | Numerical Examples | | | | |
|---|---|---|---|---|---|---|
| | | 1 | 2 | 3 | 4 | 5 |
| Maximum Magnification | | 0.270 | 0.413 | 0.700 | 0.600 | 0.600 |
| Focus Lens Unit Ln | | 2nd Lens Unit | 1st Lens Unit | 2nd Lens Unit | 2nd Lens Unit | 1st Lens Unit |
| Focus Lens Unit Lm | | 4th Lens Unit | 3rd Lens Unit | 4th Lens Unit | 4th Lens Unit | 3rd Lens Unit |
| Fw | | 24.300 | 18.600 | 24.301 | 24.298 | 24.286 |
| Ft | | 69.000 | 44.950 | 68.999 | 82.990 | 58.945 |
| $F_{Lp}$ | | 27.876 | 24.386 | 29.668 | 29.854 | 30.125 |
| $F_{Ln}$ | | -18.980 | -24.540 | -18.710 | 16.730 | -30.250 |
| $F_{Lm}$ | | -41.630 | -28.640 | -37.990 | -34.590 | -45.830 |
| $F_{Lm2}$ | | 42.600 | 36.140 | 35.430 | 30.420 | 46.140 |
| TLDm | | 166.350 | — | 154.250 | 150.080 | — |
| TLDt | | 166.350 | — | 166.440 | 157.420 | — |
| (1) $|F_{Lm}/F_{Lm2}|$ | | 0.977 | 0.792 | 1.072 | 1.137 | 0.993 |
| (2) $|F_{Lp}/F_{Lm}|$ | | 0.670 | 0.851 | 0.781 | 0.863 | 0.657 |
| (3) $|F_{Ln}/F_{Lm}|$ | | 0.456 | 0.857 | 0.492 | 0.484 | 0.660 |
| (4) TLDm/TLDt | | 1.000 | — | 0.927 | 0.953 | — |

Next, an exemplary embodiment, in which the zoom lens according to any one of the first to fifth exemplary embodiments is applied to an image pickup apparatus, will be described. The image pickup apparatus according to the exemplary embodiment of the present invention has an interchangeable lens unit including a zoom lens, and a camera body including an image sensor that is detachably connected to the interchangeable lens unit via a camera mounting portion and that receives an optical image formed by the zoom lens and converts the image into an electric image signal.

FIG. 13 is a schematic view of main components of a single-lens reflex camera. As illustrated in FIG. 13, the camera includes a photographing lens 10 having a zoom lens 1 according to one of the first to fifth exemplary embodiments. The zoom lens 1 is held by a holding member, i.e., a lens barrel 2. A camera body 20 includes a quick-return mirror 3 that reflects a light flux from the photographing lens 10 upward, a focusing screen 4 disposed at an image forming position of the photographing lens 10, a pentagonal roof prism 5 that converts a reverse image formed at the focusing screen 4 into an erect image, an eyepiece lens 6 for observing the erect image, and the like. At a photosensitive surface 7 is provided a solid-state image sensor (photoelectric conversion element) or a silver-halide photographic film that receives an image formed by a zoom lens, such as a CCD sensor or a CMOS sensor. During photographing, the quick-return mirror 3 goes off an optical path, and an image is formed on the photosensitive surface 7 by the photographing lens 10. The advantages described in the first to fifth exemplary embodiments are enjoyed effectively by the image pickup apparatus according to this exemplary embodiment. Such an image pickup apparatus is also applicable to a mirrorless single-lens reflex camera not including the quick-return mirror 3.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-153684 filed Jul. 9, 2012, which is hereby incorporated by reference herein in its entirety.

What is claimed is:

1. A zoom lens comprising, in order from an object side to an image side:
   a first lens unit having positive refractive power;
   a second lens unit having negative refractive power;
   a third lens unit having positive refractive power;
   a fourth lens unit having negative refractive power; and
   a rear lens group including one or more lens units and having overall positive refractive power,
   wherein during zooming, a distance between every adjacent lens units varies,
   wherein the second lens unit has the highest negative refractive power of all the lens units,
   wherein during focusing from an infinite distance to a minimum object distance, the second lens unit and the fourth lens unit move toward the object side, and
   wherein the following conditions are satisfied:

$0.65<|F_{Lm}/F_{Lm2}|<1.50$, $0.5<|FLp/FLm|<1.0$, and $0.6<TLDm/TLDt<1.2$, where $F_{Lm}$ is a focal length of the fourth lens unit, $F_{Lm2}$ is a focal length of the third lens unit, FLp is a focal length of the rear lens group at a wide-angle end, TLDm is a lens configuration length of the entire zoom lens at a time of achieving of a maximum photographing magnification, and TLDt is a lens configuration length of the entire zoom lens at a time of infinite-distance focusing at a telephoto end.

2. The zoom lens according to claim 1, wherein the following condition is satisfied:

$0.3<|F_{Ln}/F_{Lm}|<1.0$ where $F_{Ln}$ is a focal length of the second lens unit.

3. A zoom lens comprising, in order from an object side to an image side:
   a first lens unit having positive refractive power;
   a second lens unit having negative refractive power;
   a third lens unit having positive refractive power;
   a fourth lens unit having negative refractive power; and
   a rear lens group including one or more lens units and having overall positive refractive power,
   wherein a distance between every adjacent lens units varies during zooming,
   wherein the second lens unit has the highest negative refractive power of all the lens units,
   wherein at least the second lens unit is moved toward the object side to perform focusing from an infinite distance to a predetermined finite distance,
   wherein at least the second lens unit and the fourth lens unit move towards the object side at a telephoto end to perform macrofocusing on an object distance being shorter than the predetermined finite distance, and
   wherein the following conditions are satisfied:

$0.65<|F_{Lm}/F_{Lm2}|<1.50$, and $0.6<TLDm/TLDt<1.2$ where $F_{Lm}$ is a focal length of the fourth lens unit, $F_{Lm2}$ is a focal length of the third lens unit, TLDm is a lens configuration length of the entire zoom lens at a time of achieving a maximum photographing magnification, and TLDt is a lens configuration length of the entire zoom lens during infinite-distance focusing at a telephoto end.

4. The zoom lens according to claim 3, wherein during the macrofocusing on the object distance being shorter than the predetermined finite distance, all lens units constituting the rear lens group move toward the object side.

5. The zoom lens according to claim 3, wherein the following condition is satisfied:

$0.5<|F_{Lp}/F_{Lm}|<1.0$ where $F_{Lp}$ is a focal length of the rear lens group at a wide-angle end.

6. The zoom lens according to claim 3, wherein the following condition is satisfied:

$0.3<|F_{Ln}/F_{Lm}|<1.0$ where $F_{Ln}$ is a focal length of the second lens unit.

7. An image pickup apparatus comprising:
   a zoom lens; and
   a solid-state image sensor configured to receive an image formed by the zoom lens,
   wherein the zoom lens comprises, in order from an object side to an image side:
   a first lens unit having positive refractive power;
   a second lens unit having negative refractive power;
   a third lens unit having positive refractive power;

a fourth lens unit having negative refractive power; and
a rear lens group including one or more lens units and having overall positive refractive power,
wherein during zooming, a distance between every adjacent lens units varies,
wherein the second lens unit has the highest negative refractive power of all the lens units,
wherein during focusing from an infinite distance to a minimum object distance, the second lens unit and the fourth lens unit Lm toward the object side, and
wherein the following conditions are satisfied:

$$0.65 < |F_{Lm}/F_{Lm2}| < 1.50,$$

$$0.5 < |FLp/FLm| < 1.0, \text{ and}$$

$$0.6 < TLDm/TLDt < 1.2,$$

where $F_{Lm}$ is a focal length of the fourth lens unit, $F_{Lm2}$ is a focal length of the third lens unit, FLp is a focal length of the rear lens group at a wide-angle end, TLDm is a lens configuration length of the entire zoom lens at a time of achieving of a maximum photographing magnification, and TLDt is a lens configuration length of the entire zoom lens at a time of infinite-distance focusing at a telephoto end.

8. An image pickup apparatus comprising:
a zoom lens; and
a solid-state image sensor configured to receive an image formed by the zoom lens,
wherein the zoom lens comprises, in order from an object side to an image side:
a first lens unit having positive refractive power;
a second lens unit having negative refractive power;
a third lens unit having positive refractive power;
a fourth lens unit having negative refractive power; and
a rear lens group including one or more lens unit and having overall positive refractive power,
wherein a distance between every adjacent lens units varies during zooming,
wherein the second lens unit has the highest negative refractive power of all the lens units,
wherein at least the second lens unit is moved toward the object side to perform focusing from an infinite distance to a predetermined finite distance,
wherein at least the second lens unit and the fourth lens unit move towards the object side at a telephoto end to perform macrofocusing on an object distance being shorter than the predetermined finite distance, and
wherein the following conditions are satisfied:

$$0.65 < |F_{Lm}/F_{Lm2}| < 1.50, \text{ and}$$

$$0.6 < TLDm/TLDt < 1.2,$$

where $F_{Lm}$ is a focal length of the fourth lens unit, $F_{Lm2}$ is a focal length of the third lens unit, TLDm is a lens configuration length of the entire zoom lens at a time of achieving a maximum photographing magnification, and TLDt is a lens configuration length of the entire zoom lens during infinite-distance focusing at a telephoto end.

9. A zoom lens comprising, in order from an object side to an image side:
a first lens unit having positive refractive power;
a second lens unit having negative refractive power;
a third lens unit having positive refractive power;
a fourth lens unit having negative refractive power; and
a rear lens group including one or more lens units and having overall positive refractive power,
wherein during zooming, a distance between every adjacent lens units varies,
wherein the second lens unit has the highest negative refractive power of all the lens units,
wherein at least the second lens unit is moved toward the object side to perform focusing from an infinite distance to a predetermined finite distance,
wherein at least the second lens unit and the fourth lens unit move towards the object side at a telephoto end to perform macrofocusing on an object distance being shorter than the predetermined finite distance, and
wherein the following condition is satisfied:

$$0.6 < TLDm/TLDt < 1.2,$$

where TLDm is a lens configuration length of the entire zoom lens at a time of achieving a maximum photographing magnification, and TLDt is a lens configuration length of the entire zoom lens during infinite-distance focusing at a telephoto end.

10. An image pickup apparatus comprising:
a zoom lens; and
a solid-state image sensor configured to receive an image formed by the zoom lens,
wherein the zoom lens comprises, in order from an object side to an image side:
a first lens unit having positive refractive power;
a second lens unit having negative refractive power;
a third lens unit having positive refractive power;
a fourth lens unit having negative refractive power; and
a rear lens group including one or more lens units and having overall positive refractive power,
wherein during zooming, a distance between every adjacent lens units varies,
wherein the second lens unit has the highest negative refractive power of all the lens units,
wherein at least the second lens unit Ln is moved toward the object side to perform focusing from an infinite distance to a predetermined finite distance,
wherein at least the second lens unit and the fourth lens unit move toward the object side at a telephoto end to perform macrofocusing on an object distance being shorter than the predetermined finite distance, and
wherein the following condition is satisfied:

$$0.6 < TLDm/TLDt < 1.2,$$

where TLDm is a lens configuration length of the entire zoom lens at a time of achieving a maximum photographing magnification, and TLDt is a lens configuration length of the entire zoom lens during infinite-distance focusing at a telephoto end.

* * * * *